US012085876B2

(12) United States Patent
Seki et al.

(10) Patent No.: US 12,085,876 B2
(45) Date of Patent: Sep. 10, 2024

(54) FIXING APPARATUS

(71) Applicant: CANON KABUSHIKI KAISHA, Tokyo (JP)

(72) Inventors: Satoshi Seki, Tokyo (JP); Ryosuke Yamazaki, Chiba (JP); Osamu Someya, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 18/183,478

(22) Filed: Mar. 14, 2023

(65) Prior Publication Data

US 2023/0314988 A1 Oct. 5, 2023

(30) Foreign Application Priority Data

Apr. 1, 2022 (JP) ................................ 2022-061619

(51) Int. Cl.
*G03G 15/20* (2006.01)
*G03G 15/00* (2006.01)

(52) U.S. Cl.
CPC ..... *G03G 15/2028* (2013.01); *G03G 15/5029* (2013.01)

(58) Field of Classification Search
CPC ....................... G03G 15/2028; G03G 15/5029
See application file for complete search history.

(56) References Cited

U.S. PATENT DOCUMENTS

2011/0038652 A1* 2/2011 Kobayashi ............ G03G 21/14 399/167

FOREIGN PATENT DOCUMENTS

JP 2005321478 A 11/2005

* cited by examiner

*Primary Examiner* — Victor Verbitsky
(74) *Attorney, Agent, or Firm* — Canon U.S.A., Inc. I.P. Division

(57) ABSTRACT

An image forming apparatus includes heating and pressurizing rotary members, and a speed control unit. In a first mixed job to be executed in a first mode and where a first recording material is to be initially conveyed and a second recording material is to be conveyed subsequent to the first recording material, the speed control unit sets a conveyance speed of the first recording material to a second speed based on acquired grammage information and sets a conveyance speed of the second recording material to a first speed based on the acquired grammage information. In a second mix job to be executed in the second mode and where the second recording material is to be conveyed subsequent to the initially conveyed first recording material, the speed control unit sets the conveyance speed of the first and second recording materials to the first speed based on the acquired grammage information.

15 Claims, 15 Drawing Sheets

FIG.6A

| GRAMMAGE [gsm] | 50 ~ 100 | | 101 ~ 200 | | 201 ~ 300 | | 301 ~ 400 | | 401 ~ |
|---|---|---|---|---|---|---|---|---|---|
| PRINTING SPEED [mm/s] | 600 | 400 | 600 | 400 | 600 | 400 | 600 | 400 | 400 |
| FIXING TEMPERATURE [°C] | 200 | 150 | 200 | 150 | 220 | 160 | 220 | 160 | 180 |

FIG.6B

| GRAMMAGE [gsm] | 50 ~ 100 | 101 ~ 200 | 201 ~ 300 | 301 ~ 400 | 401 ~ |
|---|---|---|---|---|---|
| PRINTING SPEED [mm/s] | 600 | 600 | 600 | 600 | 400 |
| FIXING TEMPERATURE [°C] | 200 | 200 | 210 | 210 | 180 |

FIG.6C

| GRAMMAGE [gsm] | 50 ~ 100 | 101 ~ 200 | 201 ~ 300 | 301 ~ 400 | 401 ~ |
|---|---|---|---|---|---|
| PRINTING SPEED [mm/s] | 600 | 600 | 600 | 600 | 400 |
| FIXING TEMPERATURE [°C] | 195 | 205 | 215 | 225 | 180 |

FIG.13

| GRAMMAGE [gsm] | 50 – 100 | | 101 – 200 | | 201 – 300 | | 301 – 400 | | 401 – |
|---|---|---|---|---|---|---|---|---|---|
| PRINTING SPEED [mm/s] | 600 | 400 | 600 | 400 | 600 | 400 | 600 | 400 | 400 |
| FIXING TEMPERATURE [°C] | 200 | 150 | 200 | 160 | 220 | 160 | 220 | 160 | 180 |

FIXING APPARATUS

BACKGROUND

Field

The present disclosure relates to an image forming apparatus including a fixing apparatus for fixing a toner image on a recording material.

Description of the Related Art

Image forming apparatuses includes a fixing apparatus which fixes an unfixed toner image borne on a recording material to the recording material.

A fixing apparatus typically includes, as discussed in Japanese Patent Application Laid-Open No. 2005-321478, a heating rotary member having a heat source for heating an unfixed toner image and a pressure roller (i.e., pressurizing rotary member) for pressurizing the heating rotary member. The fixing apparatus further includes a contact-separation mechanism which can move the pressurizing rotary member between a position where the pressurizing rotary member is in contact with the heating rotary member and a position where the pressurizing rotary member is separated from the heating rotary member. When the pressurizing rotary member is at the position where the pressurizing rotary member is in contact with the heating rotary member, a nip portion is formed between the heating rotary member and the pressurizing rotary member. When a recording material bearing an unfixed toner image is conveyed to the nip portion, heat and pressure is applied to fix the unfixed toner image on the recording material at the nip portion, and the toner image is fixed to the recording material.

Because an amount of heat to fix the toner image on a recording material in toner image formation varies among types of recording material, a temperature of the heating rotary member is changed in accordance with a type of recording material to appropriately control an amount of heat to be applied to a toner image borne on a recording material.

The appropriate change in a heat amount in accordance with a type of recording material improves image quality of a toner image formed on a recording material. On the other hand, changing a temperature for each type of recording materials leads to deterioration in productivity. The fixing apparatus discussed in Japanese Patent Application Laid-Open No. 2005-321478 addresses the issue by providing an image quality prioritized mode and a productivity prioritized mode that are selectable by a user based on the purpose of use.

When a toner image is fixed on a recording material, a conveyance speed of the recording material is controlled in accordance with a grammage of the recording material, because an amount of heat for fixing is increased with increase in a grammage of the recording material, and an amount of heat for fixing is decreased with decrease in a grammage of the recording material. Accordingly, a heat application amount to fix a toner image on a recording material may be controlled in accordance with a grammage of the recording material such that a conveyance speed of a recording material of a small grammage is increased and a conveyance speed of a recording material of a large grammage is decreased.

However, in a case of a job that uses recording materials having different grammages, the conveyance speed of the recording materials has to be changed for each of the recording materials having different grammages, which decreases the number of printable sheets per unit time.

SUMMARY

The present disclosure is directed to a fixing apparatus capable of suppressing a decrease in the number of printed sheets per unit time when a job in which recording materials having different grammages are mixed is executed.

According to an aspect of the present disclosure, an image forming apparatus includes a heating rotary member configured to apply heat to a recording material, a pressurizing rotary member configured to form a nip portion by pressurizing the heating rotary member, wherein the heating rotary member and the pressurizing rotary member apply heat and pressure to the recording material to perform fixing of a toner image on the recording material, an acquisition unit configured to acquire information about a grammage of the recording material on which the toner image fixing is to be executed, and a speed control unit configured to control a conveyance speed of the recording material at the nip portion, wherein a job in which a first recording material of a first grammage and a second recording material of a second grammage greater than the first grammage are mixed is specified as a mixed job, wherein the speed control unit is capable of setting the conveyance speed of the recording material to a first speed or a second speed faster than the first speed, wherein the mixed job can be executed in any one of a plurality of modes including a first mode and a second mode, wherein, in a case where the mixed job is a first mixed job to be executed in the first mode and the first recording material is to be initially conveyed and the second recording material is to be conveyed subsequent to the first recording material, the speed control unit sets a conveyance speed of the first recording material to the second speed based on the acquired grammage information and sets a conveyance speed of the second recording material to the first speed based on the acquired grammage information, and wherein, in a case where the mixed job is a second mix job to be executed in the second mode and the first recording material is to be initially conveyed and the second recording material is to be conveyed subsequent to the first recording material, the speed control unit sets the conveyance speed of the first recording material and of the second recording material to the first speed based on the acquired grammage information.

Further features of the present disclosure will become apparent from the following description of exemplary embodiments with reference to the attached drawings.

BRIEF DESCRIPTION OF THE DRAWINGS

FIGS. 6A to 6C are tables illustrating a relationship between a grammage, a conveyance speed, and a fixing temperature in respective modes.

FIG. 13 is a table illustrating a relationship between a grammage, a conveyance speed, and a fixing temperature according to a second exemplary embodiment.

DESCRIPTION OF THE EMBODIMENTS

<Image Processing System>

Figure 1:
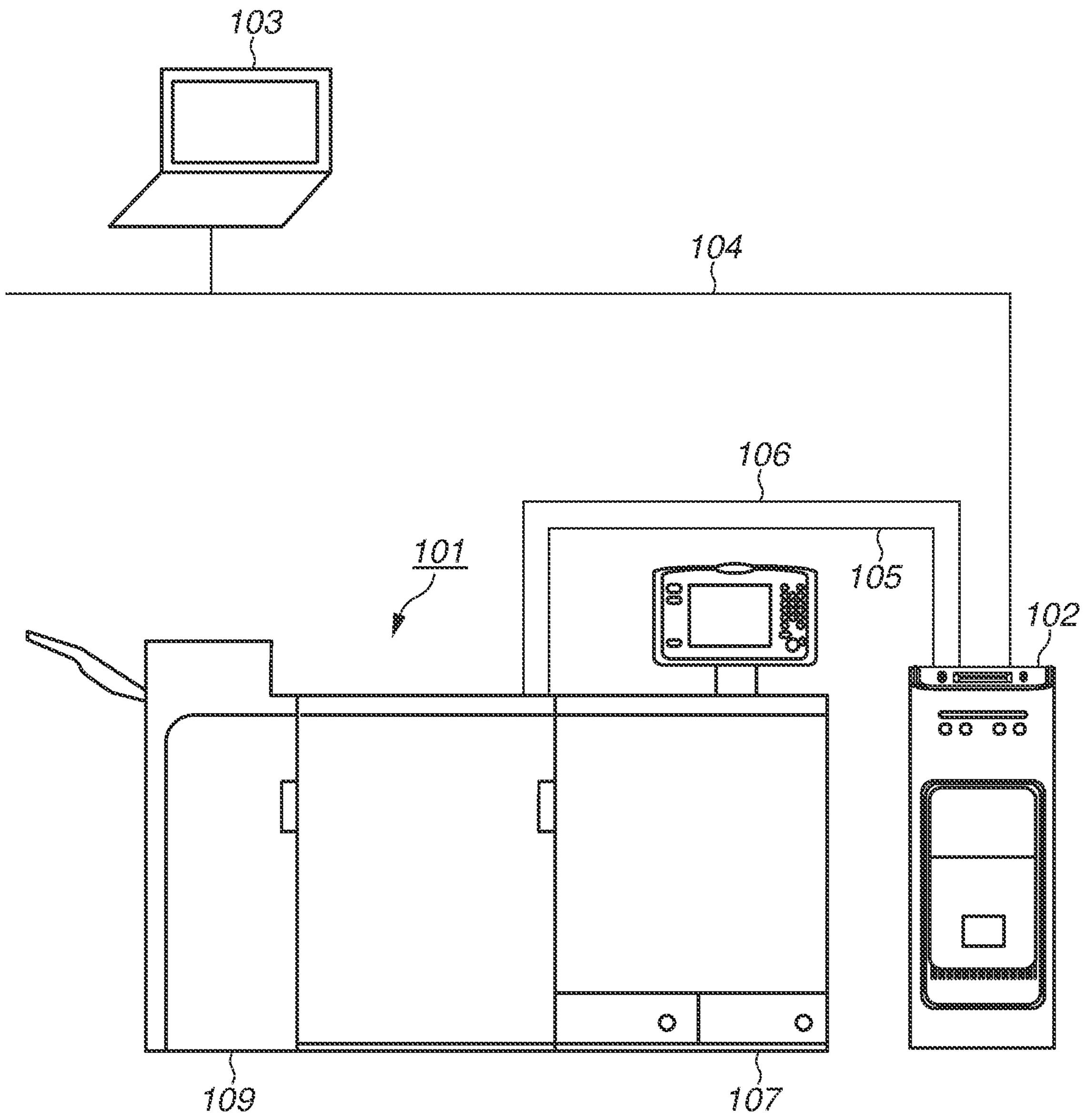
FIG. 1 is a diagram illustrating a configuration of an image processing system according to a present exemplary embodiment.

A first exemplary embodiment will be described. FIG. 1 is a diagram illustrating a configuration of an image processing system including an image forming apparatus 101 according to the present exemplary embodiment. The image processing system includes the image forming apparatus 101 and an external controller 102. For example, the image forming apparatus 101 is a multifunction peripheral (MFP).

The external controller 102 is an image processing controller, a digital frontend end (DFE), a print server, or the like.

The image forming apparatus 101 and the external controller 102 are connected to each other via an internal local area network (LAN) 105 and a video cable 106 to communicate with each other. The external controller 102 is connected to a client personal computer (PC) 103 via an external LAN 104. The external controller 102 acquires a printing instruction (print job) from the client PC 103.

A printer driver having a function for converting image data into print descriptive language processible by the external controller 102 is installed in the client PC 103. The user can issue a printing instruction by using various applications via the printer driver.

Based on a print job received from the user, the printer driver transmits image data to the external controller 102. The external controller 102 receives a print job including image data from the client PC 103, executes data analysis and rasterization processing on the image data, and instructs the image forming apparatus 101 to execute printing (image formation) based on the image data.

The image forming apparatus 101 is configured of a plurality of apparatuses including a printing apparatus 107, each having different functions, and thus complex printing processing, such as bookbinding, can be executed. The image forming apparatus 101 according to the present exemplary embodiment includes a printing apparatus 107 and a finisher 109. The printing apparatus 107 forms an image on a recording material with developer which is toner, for example. The recording material is fed from a sheet feeding unit disposed on the lower portion of a main body of the printing apparatus 107. The printing apparatus 107 forms images in respective colors of yellow (Y), magenta (M), cyan (C) and black (K). A full-color image including the respective color images superimposed on top of one another is formed on a recording material. The recording material on which the image is formed is conveyed to the finisher 109 from the printing apparatus 107. The finisher 109 stacks recording materials on which images are formed.

While the image processing system in the present exemplary embodiment includes the image forming apparatus 101 and the external controller 102 connected to the image forming apparatus 101, the external controller 102 can be omitted. For example, the image forming apparatus 101 can directly acquire a print job including image data from the client PC 103 via the external LAN 104. In this case, data analysis and rasterization processing that are executed by the external controller 102 are executed by the image forming apparatus 101. In other words, the image forming apparatus 101 and the external controller 102 can be configured integrally.

<System Configuration>

Figure 2:
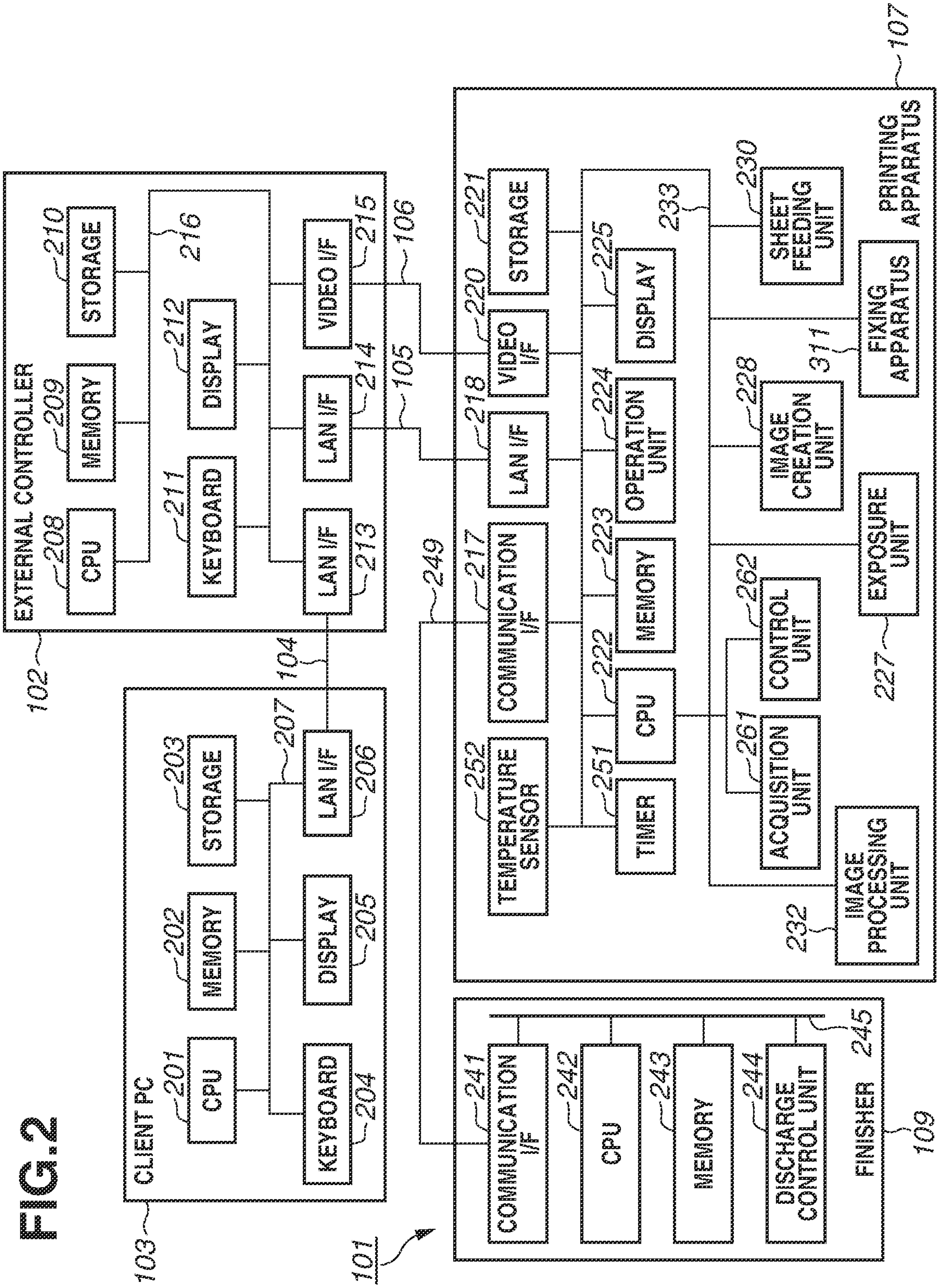
FIG. 2 is a block diagram illustrating a system configuration according to the present exemplary embodiment.

FIG. 2 is a block diagram illustrating a system configuration for controlling operation of the image processing system. Descriptions will be given of controllers which control respective operations of the image forming apparatus 101, the external controller 102, and the client PC 103.

<Printing Apparatus>

The printing apparatus 107 includes a communication interface (I/F) 217, a LAN I/F 218, and a video I/F 220 to communicate with the other apparatuses. The printing apparatus 107 includes a central processing unit (CPU) 222, a memory 223, a storage 221, and an image processing unit 232 to control operation of the printing apparatus 107. The printing apparatus 107 includes an exposure unit 227, an image creation unit 228, a fixing apparatus 311, and a sheet feeding unit 230 to create an image. The printing apparatus 107 includes an operation unit 224 and a display 225 serving as user interfaces. The printing apparatus 107 includes a timer 251 and a temperature sensor 252 to adjust a correction value that is used to appropriately correct a geometric characteristic of images that are formed on front and back faces of a recording material.

In the present exemplary embodiment, the geometric characteristic of images refers to perpendicularity and printing positions between images with respect to a recording material. These constituent elements are connected to each other via a system bus 233 to communicate with each other.

The communication I/F 217 is connected to the finisher 109 via a communication cable 249, and controls communication with the finisher 109. When the printing apparatus 107 operates in cooperation with the finisher 109, information and data are transmitted and received via the communication I/F 217. The LAN I/F 218 is connected to the external controller 102 via the internal LAN 105, and controls communication with the external controller 102. The printing apparatus 107 receives print settings from the external controller 102 via the LAN I/F 218. The video I/F 220 is connected to the external controller 102 via the video cable 106, and controls communication with the external controller 102. The printing apparatus 107 receives image data describing an image to be formed from the external controller 102 via the video I/F 220.

The CPU 222 executes a computer program stored in the storage 221 to comprehensively control operation of image processing and printing processing. The memory 223 provides a work area of the CPU 222 executing various types of processing. In image forming processing, the CPU 222 controls the exposure unit 227, the image creation unit 228, the fixing apparatus 311, and the sheet feeding unit 230.

The exposure unit 227 includes a photosensitive body, a charging wire for electrically charging the photosensitive body, and a light source for exposing the photosensitive body electrically charged by the charging wire with light to form an electrostatic latent image on the photosensitive body. Examples of the photosensitive body include a photosensitive belt including a belt-shaped elastic member on which a photosensitive layer is formed as the surface, and a photosensitive drum having a cylindrical shape on which a photosensitive layer is formed as the surface. Instead of the charging wire, a charging roller can be used. The exposure unit 227 uses the charging wire to electrically charge a surface of the photosensitive body at a uniform negative potential. The exposure unit 227 outputs laser light based on image data from the light source. The surface of the uniformly charged photosensitive body is scanned with laser light. Consequently, a potential of a position irradiated with laser light is changed, and an electrostatic latent image is formed on the surface of the photosensitive body. Four photosensitive bodies each corresponding to a different color of four colors, i.e., yellow (Y), magenta (M), cyan (C), and black (K), are disposed. Electrostatic latent images of the respective colors are formed on the four photosensitive drums.

The image creation unit 228 transfers a toner image formed on the photosensitive body to a recording material. The image creation unit 228 includes a development unit, a transfer unit, and a toner supplying unit. The development unit forms a toner image by making negatively charged toner supplied from a development cylinder adhere to the electrostatic latent image formed on a surface of the photosensitive body.

Four development units each corresponding to a different color of the four colors, i.e., yellow (Y), magenta (M), cyan (C), and black (K) are disposed. Each of the development units visualizes the electrostatic latent image on the photosensitive body with toner of the corresponding color.

The transfer unit includes an intermediate transfer belt 308, and transfers toner images to the intermediate transfer belt 308 from the photosensitive bodies. A primary transfer roller is disposed at a position opposite to each of the photosensitive bodies via the intermediate transfer belt 308. In response to positive potential applied to the primary transfer roller, a toner image is transferred to the intermediate transfer belt 308 from each of the four photosensitive bodies in a manner superimposed on top of one another, and thus a full-color toner image is formed on the intermediate transfer belt 308. The toner image formed on the intermediate transfer belt 308 is transferred to a recording material by a secondary transfer roller described below. In response to positive potential applied to the secondary transfer roller, the full-color toner image is transferred to the recording material from the intermediate transfer belt 308.

The fixing apparatus 311 fixes the transferred toner image to the recording material. The fixing apparatus 311 includes a heater and a roller pair. The fixing apparatus 311 fuses and fixes the toner image to the recording material by applying heat and pressure to the toner image on the recording material by using the heater and the roller pair. Through the above-described processing, deliverables of the recording materials on which images have been formed are produced. The sheet feeding unit 230 includes conveyance rollers and various sensors disposed on a conveyance path, and controls operation for feeding a recording material.

The operation unit 224 is an input device which accepts various settings and instructions on operations input by the user. For example, the operation unit 224 includes various input keys and a touch panel. The display 225 is an output device which displays setting information of the image forming apparatus 101 and a processing status (status information) of a print job.

The timer 251 counts time. The CPU 222 acquires the current date and time based on a count value acquired by the timer 251. The temperature sensor 252 acquires an internal temperature of the printing apparatus 107. The CPU 222 acquires an internal temperature as one environmental condition based on a result acquired by the temperature sensor 252. A humidity can also be acquired as an environmental condition, in addition to the temperature.

<Finisher>

The finisher 109 executes, for example, stapling processing on deliverables output from the printing apparatus 107. The finisher 109 includes a communication I/F 241, a CPU 242, a memory 243, and a discharge control unit 244. These constituent elements are connected to each other via a system bus 245 to communicate with each other. The communication I/F 241 is connected to the printing apparatus 107 via the communication cable 249, and controls communication with the printing apparatus 107. When the finisher 109 operates in cooperation with the printing apparatus 107, information and data are transmitted and received via the communication I/F 241. The CPU 242 executes a control program stored in the memory 243 to execute various types of control to discharge sheets. The memory 243 stores a control program. The memory 243 further provides a work area of the CPU 242 executing various types of processing. The discharge control unit 244 discharges a conveyed recording material based on an instruction received from the CPU 242.

<External Controller>

The external controller 102 includes a LAN I/F 213, a LAN I/F 214, and a video I/F 215 in order to communicate with the other apparatuses. The external controller 102 further includes a CPU 208, a memory 209, and a storage 210 to control operation of the external controller 102. The external controller 102 further includes a keyboard 211 and a display 212 as user interfaces. These constituent elements are connected to each other via a system bus 216 to communicate with each other.

The LAN I/F 213 is connected to the client PC 103 via the external LAN 104, and controls communication with the client PC 103. The external controller 102 acquires a print job from the client PC 103 via the LAN I/F 213. The LAN I/F 214 is connected to the printing apparatus 107 via the internal LAN 105, and controls communication with the printing apparatus 107. The external controller 102 transmits a print setting to the printing apparatus 107 via the LAN I/F 214. The video I/F 215 is connected to the printing apparatus 107 via the video cable 106, and controls communication with the printing apparatus 107. The external controller 102 transmits image data to the printing apparatus 107 via the video I/F 215.

The CPU 208 executes a computer program stored in the storage 210, to comprehensively execute the processing, such as reception of image data transmitted from the client PC 103, raster image processing (RIP), and transmission of image data to the image forming apparatus 101. The memory 209 provides a work area of the CPU 208 executing various types of processing. The keyboard 211 is an input device for receiving various settings and operating instructions input by a user. The display 212 is an output device for displaying a still image and a moving image of information about applications executed by the external controller 102.

<Client PC>

The client PC 103 includes a CPU 201, a memory 202, a storage 203, a keyboard 204, a display 205, and a LAN I/F 206. These constituent elements are connected to each other via a system bus 207 to communicate with each other.

The CPU 201 controls operation of the client PC 103 by executing a computer program stored in the storage 203. In the present exemplary embodiment, the CPU 201 executes creation of image data and transmission processing of a print job. The memory 202 provides a work area of the CPU 201 executing various types of processing. The keyboard 204 and the display 205 function as user interfaces. The keyboard 204 is an input device for receiving instructions from a user. The display 205 is an output device for displaying a still image and a moving image of information about applications executed by the client PC 103. The LAN I/F 206 is connected to the external controller 102 via the external LAN 104, and controls communication with the external controller 102. The client PC 103 transmits a print job including image data to the external controller 102 via the LAN I/F 206.

While, in the present exemplary embodiment, the external controller 102 and the image forming apparatus 101 are connected to each other via the internal LAN 105 and the video cable 106, another connection method can also be employed as long as data for execution of printing can be transmitted and received between the external controller 102 and the image forming apparatus 101. For example, the external controller 102 and the image forming apparatus 101 can be connected to each other via only the video cable 106. The memories 202, 209, 223, and 243 are storage devices for retaining data and programs. Memories, such as a volatile random access memory (RAM), a non-volatile read-only memory (ROM), a storage, a universal serial bus (USB) memory can be used for the memories 202, 209, 223, and 243.

<Configuration of Image Forming Apparatus>

Figure 3:
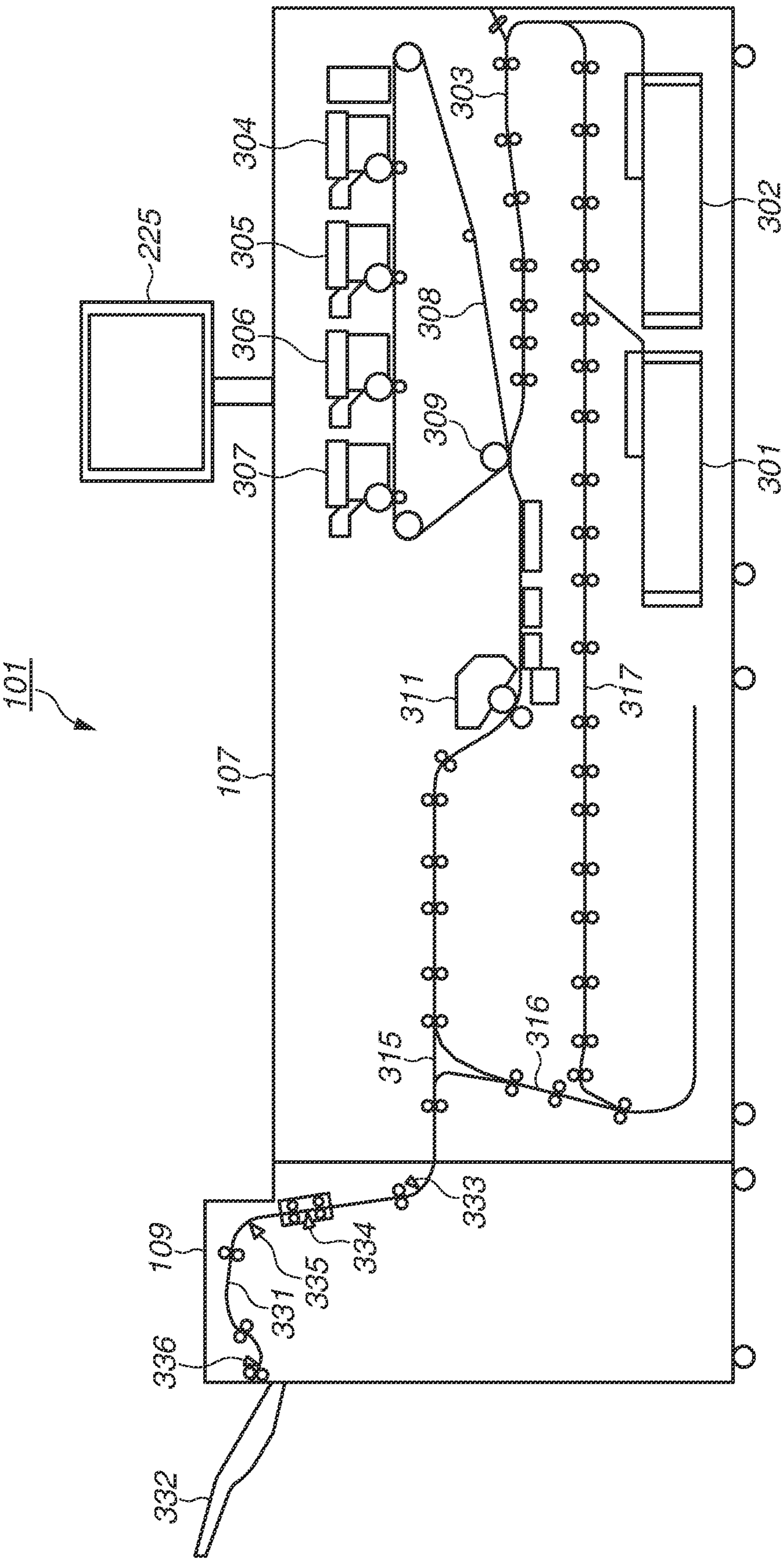
FIG. 3 is a schematic diagram of an image forming apparatus according to the present exemplary embodiment.

FIG. 3 is a diagram illustrating a configuration of the image forming apparatus 101. The display 225 is disposed on the top of the printing apparatus 107. A printing status of the image forming apparatus 101 and information about print settings are displayed on the display 225. Recording materials (deliverables) on which images are formed by the printing apparatus 107 are conveyed to the finisher 109 disposed on a later stage of the printing apparatus 107.

As the sheet feeding unit 230, the printing apparatus 107 includes a plurality of sheet feeding decks 301 and 302 and a conveyance path 303. Recording materials of different types can be stored in the sheet feeding decks 301 and 302. The information about stored recording materials, such as a grammage and a type of recording material, can be detected by the image forming apparatus 101. In the present exemplary embodiment, the information can be set by the user via the display 225.

An uppermost recording material of the recording materials stored in each of the sheet feeding decks 301 and 302 is separated from the others and conveyed to the conveyance path 303. As the exposure unit 227, the printing apparatus 107 includes image forming units 304, 305, 306, and 307 for forming images. The printing apparatus 107 forms a color image. To form a color image, the image forming unit 304 forms a black (K) image (black toner image), the image forming unit 305 forms a cyan (C) image (cyan toner image), the image forming unit 306 forms a magenta (M) image (magenta toner image), and the image forming unit 307 forms a yellow (Y) image (yellow toner image).

As the image creation unit 228, the printing apparatus 107 includes an intermediate transfer belt 308 on which the toner images are transferred from the image forming units 304, 305, 306, and 307 and a secondary transfer roller 309.

The intermediate transfer belt 308 is rotated in a clockwise direction in FIG. 3, and the toner images are sequentially transferred onto the intermediate transfer belt 308 from the image forming units 307, 306, 305, and 304 in that order in a manner superimposed on top of one another. Thus, a full-color toner image is formed on the intermediate transfer belt 308. The intermediate transfer belt 308 is rotated and conveys the toner image to the secondary transfer roller 309. A recording material is conveyed to the secondary transfer roller 309 in synchronization with a timing of arrival of the toner image conveyed to the secondary transfer roller 309. The secondary transfer roller 309 transfers the toner image borne on the intermediate transfer belt 308 to the recording material conveyed to the secondary transfer roller 309.

The printing apparatus 107 includes the fixing apparatus 311. The fixing apparatus 311 fixes the toner image to the recording material. To fix the toner image, the fixing apparatus 311 includes a heating rotary member and a pressurizing rotary member. The recording material passing through a nip portion N formed between the heating rotary member and the pressurizing rotary member receives heat and pressure, and the toner image is fused, pressurized, and fixed onto a first face of the recording material.

The recording material passed through the fixing apparatus 311 is guided to a conveyance path 315. In a case where the image forming apparatus 101 is instructed to perform two-sided printing, another image is to be formed on a back face (second face) of the recording material. Thus, the recording material is guided to a reversing path 316. A conveyance direction of the recording material conveyed to the reversing path 316 is reversed at the reversing path 316, and the recording material is conveyed to a two-sided conveyance path 317. In the reverse conveyance, the front and back faces of the recording material are reversed by the reversing path 316 and the two-sided conveyance path 317. The recording material is conveyed to the conveyance path 303 by the two-sided conveyance path 317 and passes through the secondary transfer roller 309 and the fixing apparatus 311, whereby an image is formed on the second face different from the first face.

After image formation is executed on one side or two sides of the recording material by the one-sided printing operation or the two-sided printing operation, the recording material is conveyed to the conveyance path 315 and delivered to the finisher 109.

The finisher 109 can stack the recording materials delivered from the printing apparatus 107. The finisher 109 includes a conveyance path 331 and a stacking tray 332 on which the recording materials are stacked. Conveyance sensors 333, 334, 335, and 336 are disposed on the conveyance path 331. The recording materials conveyed from the printing apparatus 107 are stacked on the stacking tray 332 via the conveyance path 331. The conveyance sensors 333, 334, 335, and 336 detect each of the recording materials conveyed to and passing through the conveyance path 331. In a case where a leading end or a trailing end of the recording material in a conveyance direction is not detected by the conveyance sensors 333, 334, 335, and 336 even though a predetermined time has passed since conveyance of the recording material was started, the CPU 242 determines that conveyance jam (conveyance malfunction) has occurred in the finisher 109. In this case, the CPU 242 notifies the printing apparatus 107 of occurrence of the conveyance jam.

<Fixing Apparatus>

Figure 4:
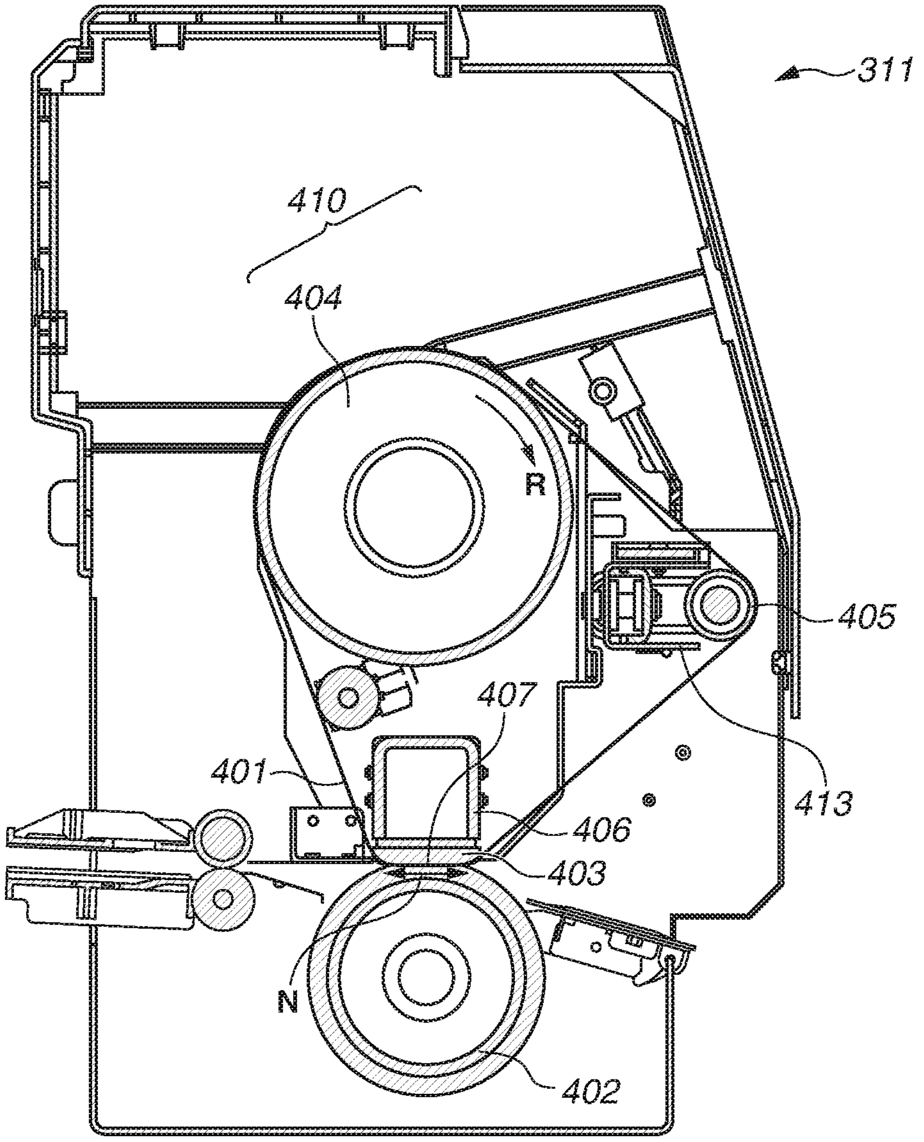
FIG. 4 is a schematic diagram of a fixing apparatus according to the present exemplary embodiment.

A configuration of the fixing apparatus 311 according to the present exemplary embodiment will be described in detail with reference to FIG. 4. FIG. 4 is a diagram illustrating a cross-sectional view of the fixing apparatus 311 according to the present exemplary embodiment. A recording material is conveyed in a direction from right to left as seen in FIG. 4. The fixing apparatus 311 includes a heating unit 410 having a heat source and a pressurizing rotary member (hereinafter, called "pressure roller") 402 which forms the nip portion N with the heating unit 410. The heating unit 410 includes a fixing belt (hereinafter, called "belt") 401 as an endless rotatable heating rotary member, a pad member (hereinafter, called "pad") 403 as a fixing member, a heating roller 404, and a steering roller 405.

The belt 401 is a thin cylindrical-shaped member having thermal conductivity and thermal resistivity. In the present exemplary embodiment, the belt 401 has a three-layer structure including a base layer, an elastic layer formed on an outer circumferential surface of the base layer, and a release layer formed on an outer circumferential surface of the elastic layer. The base layer is made of a polyimide resin (PI) material having a thickness of 60 micrometers (μm), the elastic layer is made of a silicone rubber material having a thickness of 300 μm, and the release layer is made of a fluorine-containing resin material such as a copolymer of tetrafluoroethylene and perfluoroalkoxyethylene (PFA), having a thickness of 30 μm. Then, the belt 401 is stretched on the pad 403, the heating roller 404, and the steering roller 405.

The pad 403 is a member pressed against and brought into contact with the pressure roller 402 via the belt 401 to form a nip portion N having a predetermined width in a conveyance direction of the recording material. The pad 403 has a rectangular-shape cross-sectional face having long sides in the width direction of the belt 401. A material having a heat-resisting property is used for the pad 403, and the pad 403 is made of liquid crystalline polymeric (LCP) resin.

A sliding sheet 407, whose surface is coated with polytetrafluoroethylene, and silicon oil S (hereinafter, called "oil S") as a lubricant are interposed between the pad 403 and the belt 401, so that the belt 401 can smoothly slide over the pad 403.

The sliding sheet 407 is formed of a polyimide base material having a thickness of 70 μm, surface of which is coated with PTFE. Because the sliding sheet 407 is disposed to improve the sliding performance of the pad 403 and the belt 401, a coating to improve the sliding performance can be applied on a surface layer of the pad 403 instead of the sliding sheet 407.

A stay 406 is disposed on the inner circumference side of the belt 401. The stay 406 is disposed on the inner side of the pad 403 opposite to a side where the sliding sheet 407 is disposed. The stay 406 is a reinforcing member having rigidity, which is longer in the width direction of the belt 401 and supports the pad 403 from a rear side thereof. A drawn material made of SUS 304 stainless steel having a thickness of 3 millimeters (mm) is used as the material of the stay 406, and a cross-sectional face of the stay 406 is formed in a hollowed square shape, and thus the strength of the stay 406 is ensured. When the pressure roller 402 presses the pad 403 against the stay 406, the stay 406 provides strength to the pad 403 to ensure the pressure generated at the nip portion N. A material other than the stainless steel can be used for the stay 406 as long as the strength of the stay 406 can be ensured.

The heating roller 404 is formed of a stainless pipe having a thickness of 1 mm, and a halogen heater (not illustrated) is installed in the inner side. Therefore, the heating roller 404 can generate heat up to a predetermined temperature. The belt 401 is heated by the heating roller 404, and based on a temperature detected by a thermistor, a temperature of the belt 401 is controlled to a fixing temperature in accordance with a sheet type. The thermistor can detect not only a surface temperature of the heating roller 404 but also a surface temperature of the belt 401. Further, the heating roller 404 can be driven rotationally. The rotation of the heating roller 404 being driven can increase tensile force of the belt 401 between the nip portion N and the heating roller 404 in a rotation direction of the belt 401.

With this configuration, the curvature at an exit of the nip portion N can be increased in the rotation direction of the belt 401, and thus releasing performance of a recording material can be improved. In the present exemplary embodiment, the fixing temperature refers to a surface temperature of the heating roller 404. However, the present exemplary embodiment is not limited thereto. The fixing temperature can be a temperature of the heating roller 404 or a temperature of the belt 401 detected by the thermistor.

The steering roller 405 is supported by a steering frame 413 and suspends the belt 401. A steering frame 413 turns around to change alignment of the steering roller 405 with respect to the other suspending members. With this configuration, a tensile force difference between upstream and downstream portions of the belt 401 from the steering frame 413 is generated, whereby the position of the belt 401 in the width direction is controlled. The steering roller 405 is urged by a spring supported by the steering frame 413, and thus steering roller 405 also functions as a tension roller which applies a predetermined degree of tensile force to the belt 401.

The pressure roller 402 includes a shaft, an elastic layer formed on the outer circumferential surface of the shaft, and a release layer formed on the outer circumferential surface of the elastic layer. The shaft is made of stainless steel, the elastic layer is made of conductive silicon rubber having a thickness of 5 mm, and the release layer is made of fluorine-containing resin, such as PFA, having a thickness of 50 μm. The pressure roller 402 is axially supported by a frame of the fixing apparatus 311, and a gear is fixed to one end portion of the pressure roller 402. The pressure roller 402 is connected to a driving source via the gear and rotationally driven. The belt 401 is rotated in a direction indicated by an arrow R by being held between the rotating pressure roller 402 and the pad 403.

As described above, the pad 403, the heating roller 404, and the steering roller 405 are disposed on the inner circumferential side of the belt 401, and suspend the belt 401. The belt 401 is held between the pressure roller 402 and the pad 403, and rotated together with rotational driving of the pressure roller 402. The belt 401 accumulates heat generated by the heating roller 404. Heat and pressure for fixation are applied to a recording material bearing an unfixed toner image when the recording material is held and conveyed by the pressure roller 402 and the belt 401 at the nip portion N, whereby a toner image is fixed to the recording material.

<Relationship Between Grammage and Conveyance Speed>

The image forming apparatus 101 according to the present exemplary embodiment can convey a recording material at a plurality of different speeds, including a first speed and a second speed, which are speeds of the recording material passing through the secondary transfer roller 309 and the fixing apparatus 311. In the present exemplary embodiment, the first speed is the low speed of 400 millimeters per second (mm/s), and the second speed is the high speed of 600 mm/s. While, in the present exemplary embodiment, the two speeds are used as examples, the image forming apparatus 101 can convey recording materials at three or more different speeds.

The image forming apparatus 101 according to the present exemplary embodiment can form an image on recording materials of a large grammage and a small grammage. In the present exemplary embodiment, a recording material of a smaller grammage is called a recording material of a first grammage, and a recording material of a large grammage is called a recording material of a second grammage.

A reason for conveying the recording materials at different speeds in the present exemplary embodiment will be described. A heat capacity of a recording material increases with increase in a grammage of a recording material. The larger the grammage of the recording material, the heat amount to fix a toner image is greater. A time for applying heat to the recording material at the nip portion N decreases with increase in the conveyance speed of the recording material. If a recording material of a large grammage is conveyed at high speed, fixability may not be ensured. In order to ensure fixability with respect to the recording material of a large grammage, the image forming apparatus 101 is provided with the low conveyance speed in addition to the high conveyance speed. Further, high image quality can be ensured by increasing time for applying heat at the nip portion N.

At the high speed of 600 mm/s (i.e., second speed), a certain level of image quality can be satisfied with certain types of recording materials, such as a recording material of the first grammage, i.e., a recording material of a small grammage. Thus, the image forming apparatus 101 is provided with a low conveyance speed of 400 mm/s (i.e., first speed), and a certain level of image quality can be satisfied with a recording material of the second grammage, i.e., a recording material of a large grammage. Further, the image forming apparatus 101 realizes certain levels of fixability and image quality by changing the conveyance speed and the fixing temperature (setting temperature) for each of recording materials. The image forming apparatus 101 can receive page information from the external controller 102 before feeding a recording material. The information includes information about a sheet feeding deck which stores the recording material to be fed, information about a size, a type (e.g., coated paper or embossed paper), and a grammage of the recording material, and information indicating whether the page is a last page of a job.

The conveyance speed and the fixing temperature are determined based on the grammage. The grammage, the conveyance speed, and the fixing temperature are determined more specifically when an operation mode is selected by the user. In the present exemplary embodiment, the conveyance speed and the fixing temperature are determined when the grammage is determined. However, the conveyance speed and the fixing temperature may be determined by another method. For example, the conveyance speed and the fixing temperature may be determined based on a size or a type of the recording material.

With respect to a recording material of a large grammage, the image forming apparatus 101 conveys the recording material at high speed and executes fixation. With respect to a recording material of a small grammage, the image forming apparatus 101 conveys the recording material at low speed and executes fixation. The conveyance speed is changed in accordance with a grammage of the recording material.

There is an issue that the number of printed sheets per unit time (i.e., productivity) is decreased when a job in which recording materials of a small grammage and a large grammage are mixed (hereinbelow referred to as mixed job) is to be executed. The decrease is caused by time for changing the conveyance speed. In the mixed job, a conveyance speed is changed every time a grammage of the recording material is changed. Specifically, when a grammage of a recording material is changed from a smaller grammage to a larger grammage, a conveyance speed of a recording material has to be changed from high speed to low speed in order to ensure fixability. The time for changing the conveyance speed is approximately 30 seconds. Thus, the time for changing the conveyance speed is counted as downtime. Because the conveyance speed is changed every time the grammage of the recording material is changed, productivity of the mixed job is lowered. The fixing apparatus according to the present exemplary embodiment can suppress a decrease in productivity by reducing the time for changing the conveyance speed of the recording material when the mixed job is executed. Details thereof are described below.

Figure 5A:
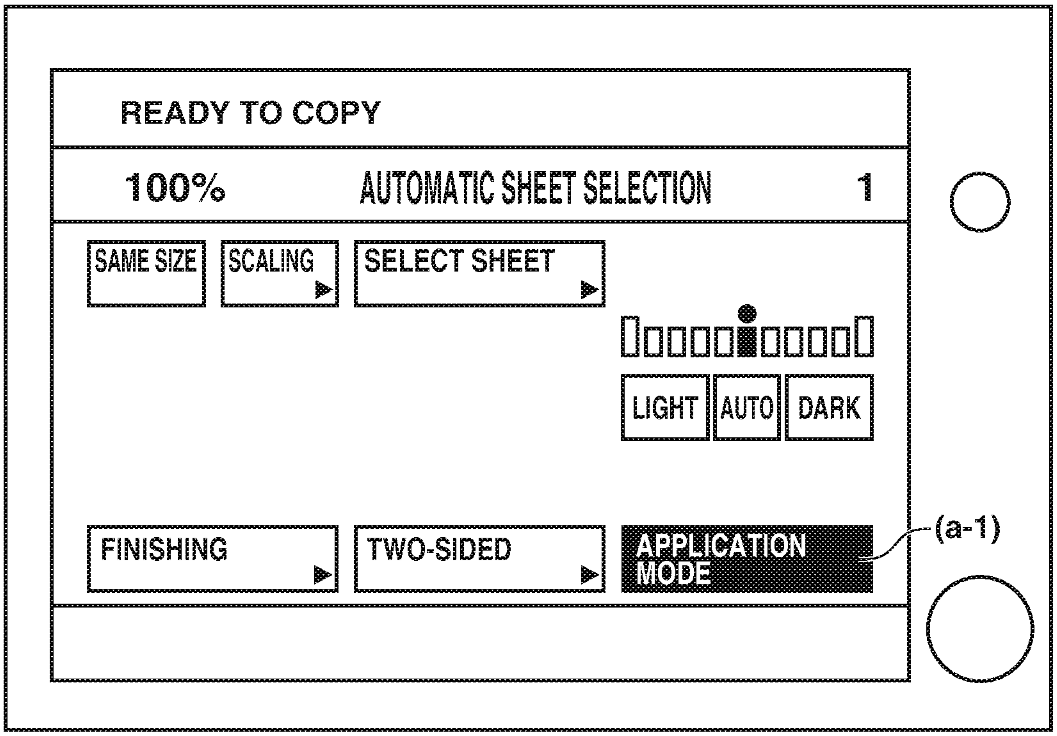
FIGS. 5A to 5C are diagrams each illustrating a mode setting screen.
Figure 5B:
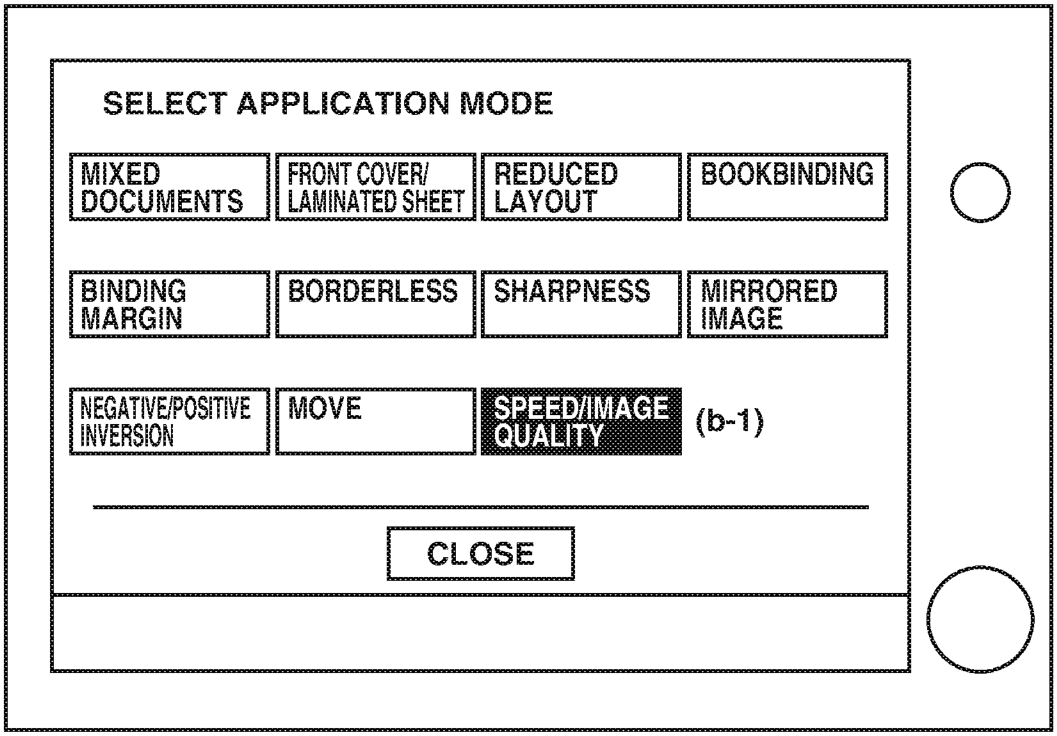

First, a printing mode provided with the fixing apparatus 311 according to the present exemplary embodiment will be described. The fixing apparatus 311 has a productivity prioritized mode and an image quality prioritized mode. More specifically, the fixing apparatus 311 has a plurality of modes including a first productivity prioritized mode, a second productivity prioritized mode, and an image quality prioritized mode. On a setting screen of the display 225 displayed by the CPU 222, the user can set an operation mode relating to the grammage, the conveyance speed and/or the fixing temperature from among the above-described operation modes. FIG. 5A illustrates an initial screen. When the user selects a software key "APPLICATION MODE" (a-1) from the initial screen, the CPU 222 displays an application mode selection screen in FIG. 5B on the display 225.

Figure 5C:
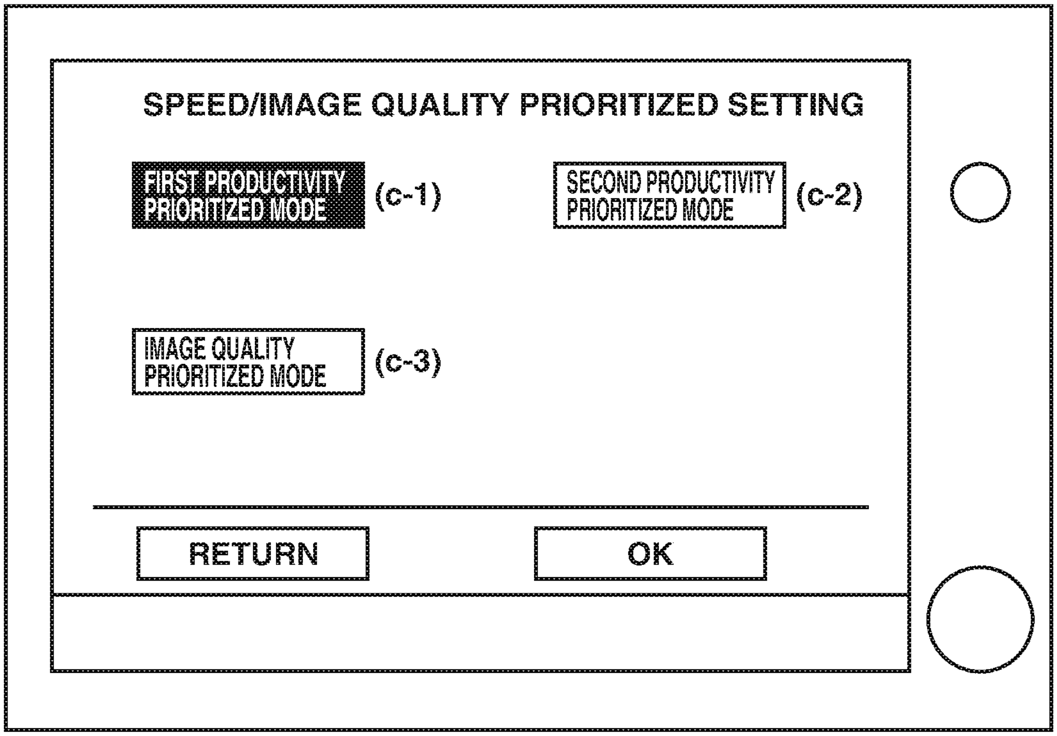

When the user selects a software key "SPEED/IMAGE QUALITY" (b-1) from the application mode selection screen, the CPU 222 displays a speed/image quality prioritized mode setting screen in FIG. 5C on the display 225.

When the user selects "FIRST PRODUCTIVITY PRIORITIZED MODE" (c-1) illustrated in FIG. 5C and presses "OK", the image forming operation is executed based on a relationship between the grammage, the conveyance speed, and the fixing temperature illustrated in FIG. 6A. In the present exemplary embodiment, a recording material having a grammage of 400 grammage (gsm) or less can be printed at a speed of either 600 mm/s or 400 mm/s. A method of determining at which speed the recording material is to be printed in the first productivity prioritized mode is described below in "Control of Changing In-Printing Speed". In a case where the user selects "SECOND PRODUCTIVITY PRIORITIZED MODE" (c-2) and presses "OK" illustrated in FIG. 5C, an image forming operation is executed based on a relationship between a grammage, a conveyance speed, and a fixing temperature illustrated in FIG. 6B. A recording material of 400 gsm or less is printed at a conveyance speed of 600 mm/s. In the first productivity prioritized mode, recording materials of 400 gsm or less are conveyed at the speed of 600 mm/s or the speed of 400 mm/s. Consequently, fixability and image quality may slightly vary between the recording material conveyed at 600 mm/s and the recording material conveyed at 400 mm/s. However, in the second productivity prioritized mode, recording materials of 400 gsm or less are conveyed at 600 mm/s. Thus, in comparison to the first productivity prioritized mode, variations in the fixability and the image quality are less likely to occur among the recording materials. When the user selects "IMAGE QUALITY PRIORITIZED" (c-3) and presses "OK" illustrated in FIG. 5C, the image forming operation is executed based on a relationship between a grammage, a conveyance speed, and a fixing temperature illustrated in FIG. 6C. The fixing temperature of the recording material of 400 gsm or less is controlled precisely, and thus an image with more preferable image quality can be printed in comparison to the first and second productivity prioritized modes. The processing to be executed in the second productivity prioritized mode and the image quality prioritized mode is also described below in "Control of Changing In-Printing Speed".

In the present exemplary embodiment, the high conveyance speed and the low conveyance speed are 600 mm/s and 400 mm/s, respectively. However, different speeds can be used as the conveyance speeds. Further, three or more different speeds can be used as the conveyance speeds.

<Control of Changing In-Printing Speed>

Figure 7:
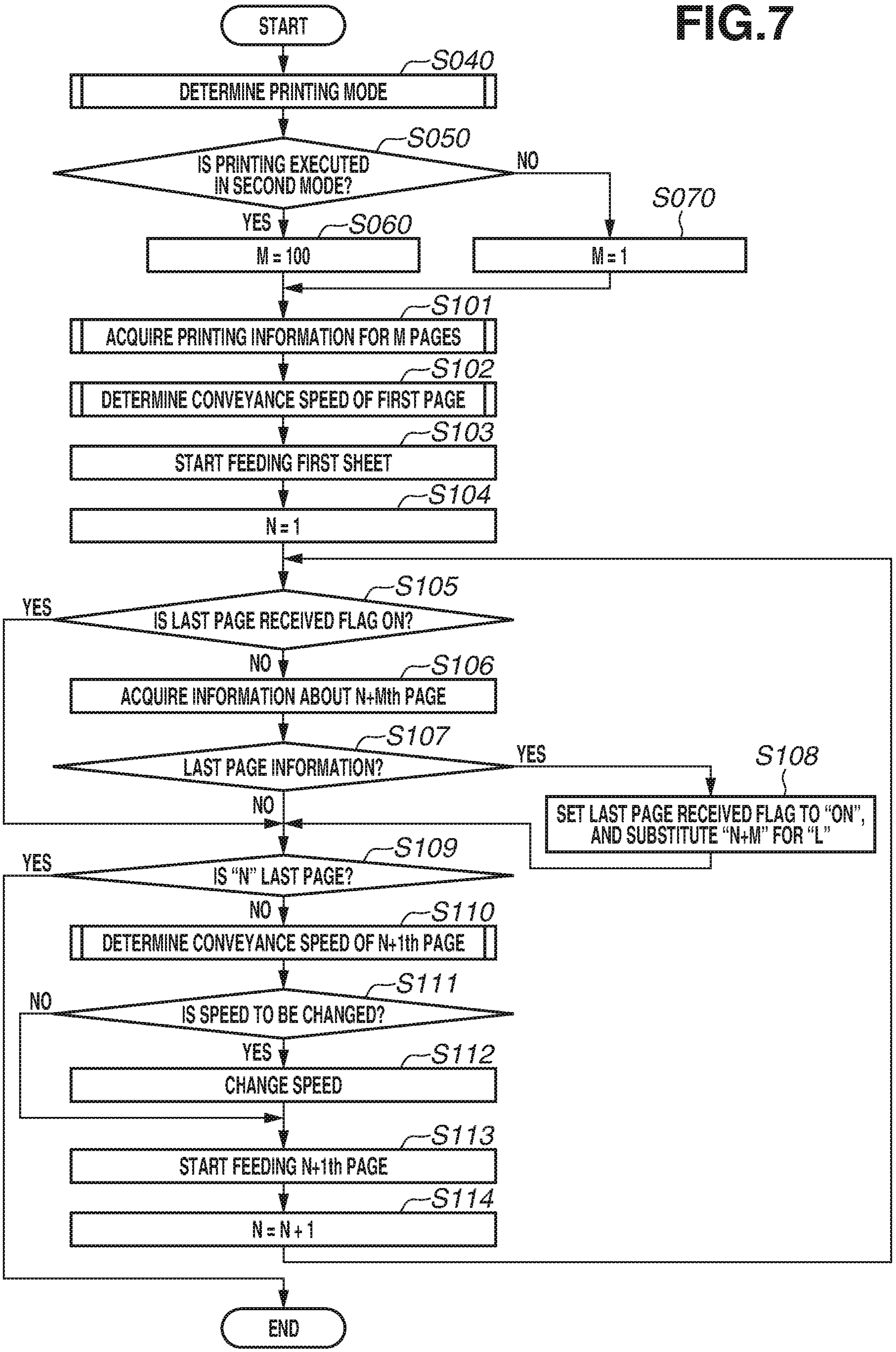
FIG. 7 is a flowchart illustrating image forming processing according to the present exemplary embodiment.

FIG. 7 is a flowchart illustrating image forming processing according to the present exemplary embodiment. In the processing illustrated in the flowchart, scheduled printing information of a plurality of pages is acquired in advance of a print job, and then, based on the acquired information, a conveyance speed of a recording material is set such that time up to completion of the print job, which includes the time for changing the temperature of the fixing apparatus 311 and the time for sheet conveyance, can be shortened.

The processing is started when the printing apparatus 107 receives a start instruction of a print job from the operation unit 224 or the client PC 103.

In step S040, the CPU 222 received a start instruction of a print job determines whether to execute the print job in a second mode. In a first mode, information about a plurality of recording materials is not acquired before a print job is executed. In the second mode, information about a plurality of recording materials is acquired before a print job is executed.

In step S050, the CPU 222 determines in which printing mode the print job is to be executed. In a case where the user selects the first productivity prioritized mode on the setting screen in FIG. 5C, the print job is executed in the second mode. In a case where the user selects the second productivity prioritized mode or the image quality prioritized mode on the setting screen in FIG. 5C, the print job is executed in the first mode.

In a case where the CPU 222 determines that the print job is executed in the second mode (YES in step S050), the processing proceeds to step S060. In step S060, before the print job is started, the CPU 222 sets the number of pages M of the recording materials, which is contained in information acquired by an acquisition unit 261, to 100. In the present exemplary embodiment, the information about recording materials acquired by the acquisition unit 261 is information about grammages of the recording materials.

In a case where the CPU 222 determines that the print job is executed in the first mode (NO in step S050), the processing proceeds to step S070. In step S070, the CPU 222 sets the number of pages M to 1.

In step S101, the CPU 222 received a start instruction of the print job executes processing for acquiring the information about recording materials. Specifically, the CPU 222 acquires printing information about M pages of recording materials scheduled to be printed. The processing for acquiring the information about recording materials scheduled to be printed will be described below with reference to FIG. 8.

In step S102, a control unit 262 controls the conveyance speed of the first page by the conveyance speed determination processing of the first page. The conveyance speed determination processing of the first page will be described below with reference to FIG. 9.

In step S103, after setting the conveyance speed, the CPU 222 starts printing of the first page based on the setting of the conveyance speed of the first page.

In step S104, the CPU 222 sets the number of fed sheets N to 1.

In step S105, the CPU 222 determines whether a last page received flag is ON.

In a case where the last page received flag is not ON (NO in step S105), the processing proceeds to step S106. In step S106, because printing is executed continuously, the CPU 222 acquires data of the N+Mth page while the print job is being executed.

In step S107, the CPU 222 determines whether the acquired page information is the information about the last page of the job.

In a case where the acquired page information is information about the last page of the job (YES in step S107), the processing proceeds to step S108. In step S108, the CPU 222 sets the last page received flag to ON, and substitutes N+M for the last page number L. The processing proceeds to step S109.

In a case where the last page received flag is ON in step S105 (YES in step S105) or the acquired page information is not the information about the last page of the job in step S107 (NO in step S107), the processing proceeds to step S109.

In step S109, the CPU 222 determines whether a page to be printed exists, i.e., whether the number of fed sheets N is equal to the last page number L. In a case where the number of fed sheets N is equal to the last page number L (YES in step S109), the CPU 222 waits completion of printing of the last page and ends the print job.

In a case where the number of fed sheets N is not equal to the last page number L (NO in step S109), the processing proceeds to step S110. In step S110, the CPU 222 determines a conveyance speed of the N+1th page by in-printing conveyance speed determination processing. The conveyance speed determination processing will be described below in "In-Printing Conveyance Speed Determination Processing" with reference to FIG. 10.

After the conveyance speed is determined, in step S111, the CPU 222 determines whether a speed is to be changed.

In a case where the CPU 222 determines to change a speed in step S111 (YES in step S111), the processing proceeds to step S112. In step S112, the CPU 222 executes the processing for changing the speed.

In a case of changing the speed, the CPU 222 changes a speed at a timing when the information about the N+1th page is acquired. However, the timing is not limited to the above, and the speed can be changed when the N+1th page is printed.

In a case where the CPU 222 determines not to change the speed in step S111 (NO in step S111), the processing proceeds to step S113. In step S113, the CPU 222 feeds the N+1th page at the same speed as the speed of the previous page, i.e., the Nth page. After the processing for changing the speed in step S112, the CPU 222 feeds the N+1th page. At the same time, the fixing temperature may be changed as necessary.

In step S114, "N+1" is set to the number of fed sheets N, and the processing returns to step S105.

Figure 12:
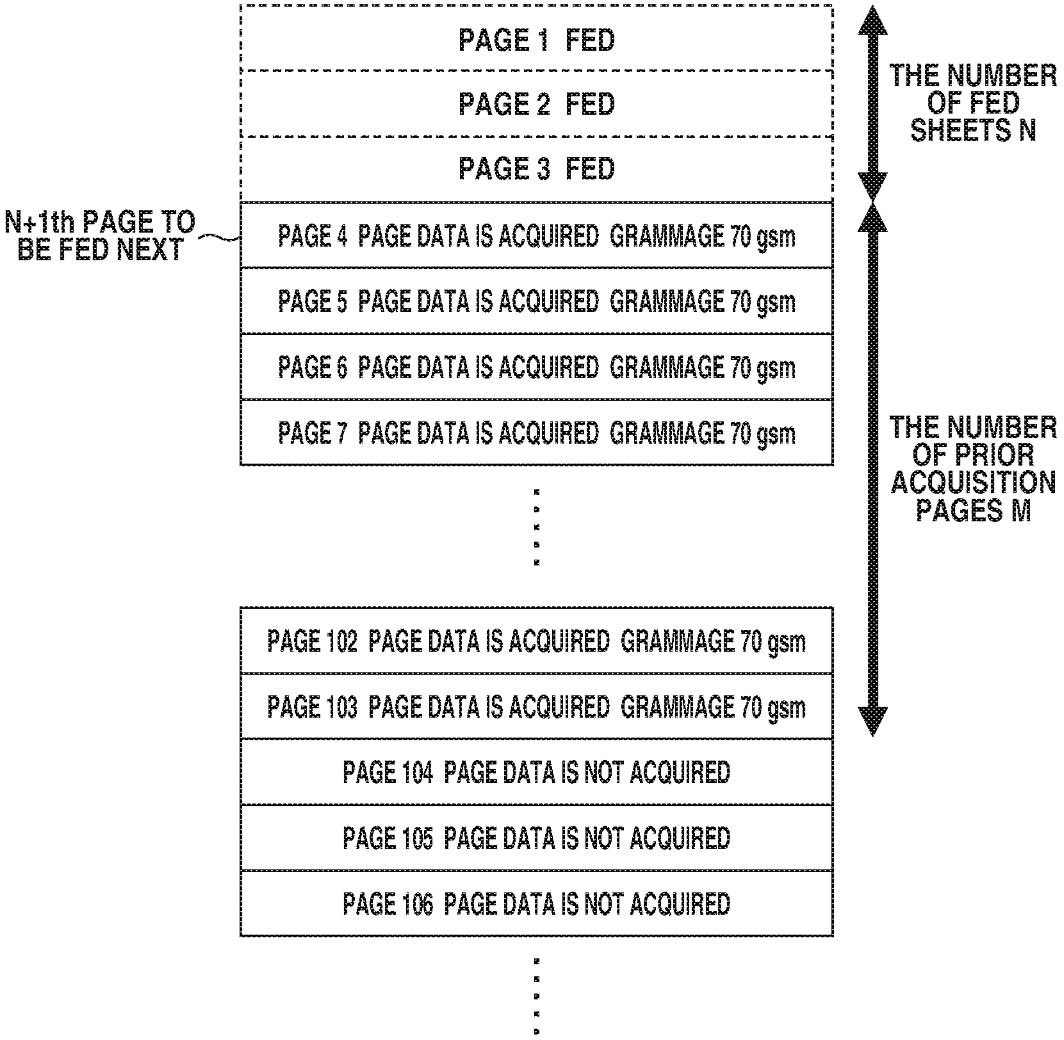
FIG. 12 is a conceptual diagram of the page information.

A relationship between a page of which information is to be acquired, a page fed already, and a page that is used for the determination will be specifically described with reference to a conceptual diagram illustrating printing page information in FIG. 12. In the second mode, information about the 103rd page is acquired before feeding operation of the fourth page is started. In a state in which feeding operation of the third page has been completed (N=3), the CPU 222 acquires the printing information of the 103rd page (N+M=103) to determine a speed of the fourth page (N+1=4). Then, the CPU 222 executes determination of the speed by using the information about 100 pages (M=100) from the fourth page to the 103rd page.

As described above, according to the present exemplary embodiment, a frequency of changing the conveyance speed in the second mode can be less than a frequency of changing the conveyance speed in the first mode. With this configuration, the time for completing the print job can be shortened.

Further, in the present exemplary embodiment, with respect to a predetermined recording material, a speed is changed between two speeds, i.e., 400 mm/s (first speed) and 600 mm/s (second speed), based on the printing information. However, the speed can be changed as necessary, and the speed may be changed between three or more different speeds.

Further, in the present exemplary embodiment, the fixing temperature is determined to one temperature in the first and second productivity prioritized modes. However, the fixing temperature can be selectable from among temperatures of a predetermined range. Further, information can be acquired by the scheduled printing information acquisition processing, and an appropriate temperature setting can be selected by the user.

Figure 11:
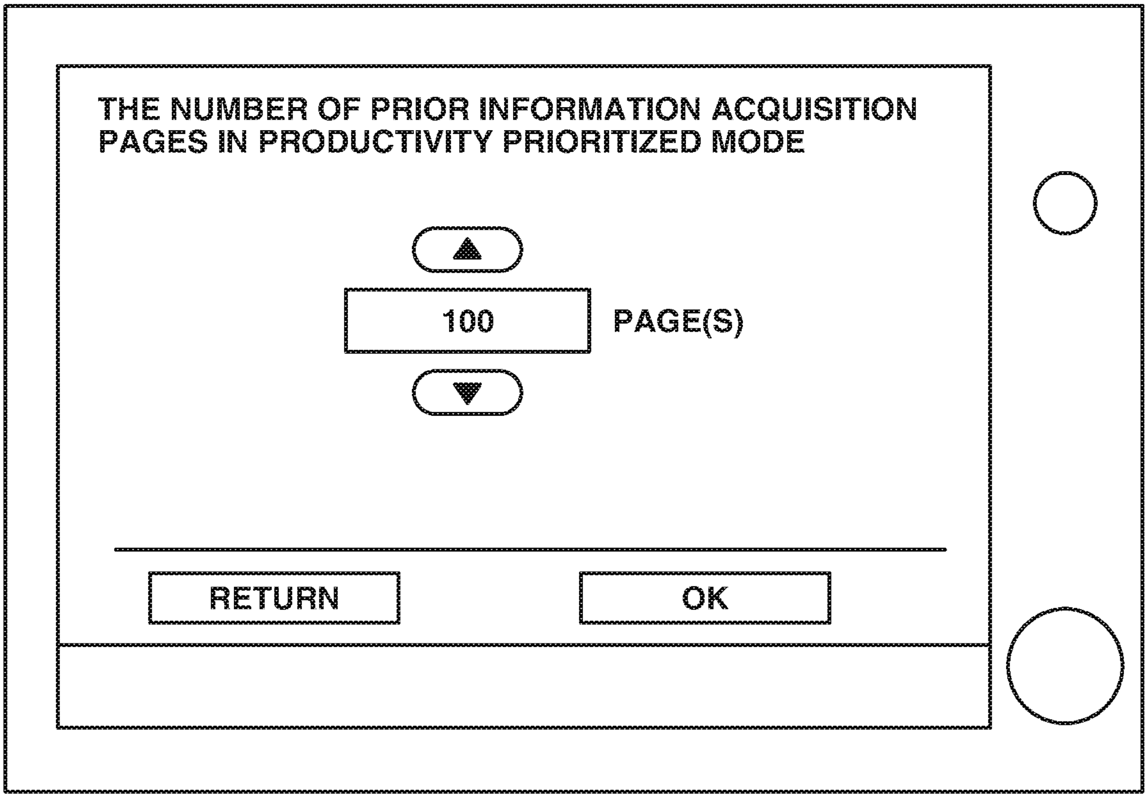
FIG. 11 is a diagram illustrating a screen for a setting of the number of acquisition pages.

In the present exemplary embodiment, the CPU 222 acquires the scheduled printing information for 100 pages and executes the determination. However, the present exemplary embodiment is not limited thereto. The number of pages in the information acquisition can be a different value, such as 120 pages, or can be changed optionally. For example, on a setting screen illustrated in FIG. 11, the user can set the number of pages in the information acquisition based on a print job desired to be executed by the user. Alternatively, the determination can be executed by using the information about pages already acquired, or determination may be executed by using data corresponding to the number of pages which is changed based on conditions.

Further, in the present exemplary embodiment, the conveyance speed is determined based on the information about a grammage described in the scheduled printing information. However, the conveyance speed can be determined based on the information about a size or a type of the recording material.

In the conveyance speed determination processing, the speed can be determined based on a calculation of the shortest printing completion time. For example, the calculation is performed on the precondition that printing 100 pages at 400 mm/s is faster than printing 100 pages at speeds changed between 600 mm/s and 400 mm/s.

However, in a case of acquiring the speed by calculation, the determination may be made by calculation of the time for changing the conveyance speed. In this way, in a case where it is determined that printing time can be shortened by changing the conveyance speed, the printing is executed while the conveyance speed is changed.

<Scheduled Printing Information Acquisition Processing>

Figure 8:
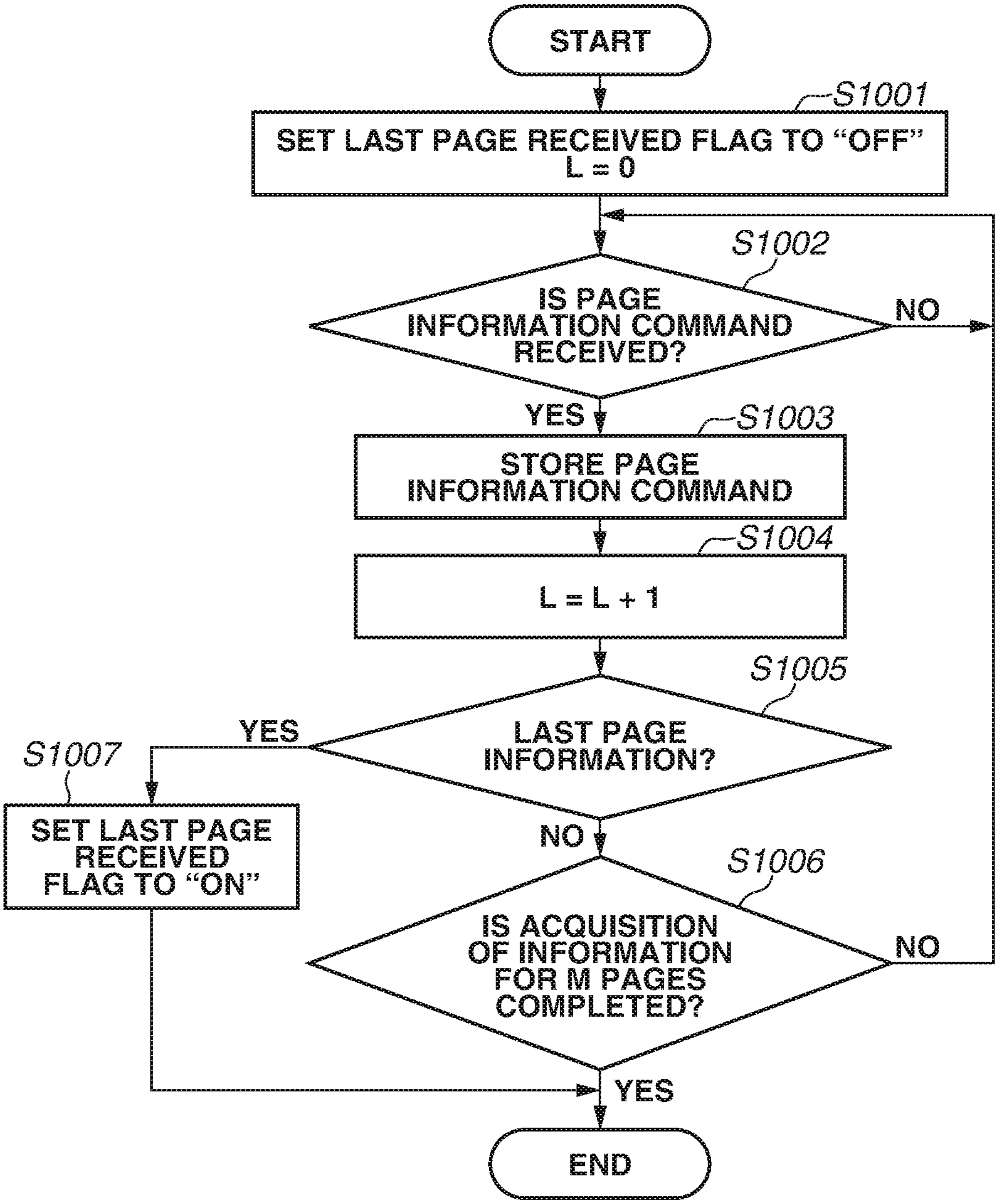
FIG. 8 is a flowchart illustrating processing for acquiring page information.

FIG. 8 is a flowchart illustrating the processing that is executed by the CPU 222 by causing the acquisition unit 261 to acquire scheduled printing information for 100 pages (e.g., information about grammages of printing materials) from the external controller 102.

In step S1001, the CPU 222 sets the last page received flag to OFF, and sets the last page number L to 0.

In step S1002, the CPU 222 determines whether the acquisition unit 261 has acquired a page information command of one page from the external controller 102. The page information command includes information about a type, a grammage, and a size of a printing material and information about whether a page is a last page of the job. In a case where the CPU 222 determines that the acquisition unit 261 has acquired a page information command (YES in step S1002), the processing proceeds to step S1003. In a case where the CPU 222 determines that the acquisition unit 261 has not acquired a page information command (NO in step S1002), the processing proceeds to step S1006.

In step S1003, the CPU 222 stores the page information command acquired by the acquisition unit 261 in the memory 223.

In step S1004, the CPU 222 increments the last page number L by one.

In step S1005, the CPU 222 determines whether the page information saved in step S1003 is last page information of the job.

In a case where the CPU 222 determines that the information is not the last page information in step S1005 (NO in step S1005), the processing proceeds to step S1006. In step S1006, the CPU 222 determines whether acquisition of information for M pages is completed, i.e., whether "L" is equal to "M". In a case where acquisition of information for M pages is not completed (NO in step S1006), the processing returns to step S1002. In a case where acquisition of information for M pages is completed (YES in step S1006), a subroutine of the processing is ended.

In a case where the CPU 222 determines that the information is the last page information in step S1005 (YES in step S1005), the processing proceeds to step S1007. In step S1007, the CPU 222 sets the last page received flag to ON, and the subroutine of the processing is ended regardless of whether information for M pages is acquired in advance.

In the above-described processing, the CPU 222 can acquire the scheduled printing information for M pages, or can acquire information for L pages when the entire job is less than M pages.

<Determination Processing of Conveyance Speed of First Page>

Figure 9:
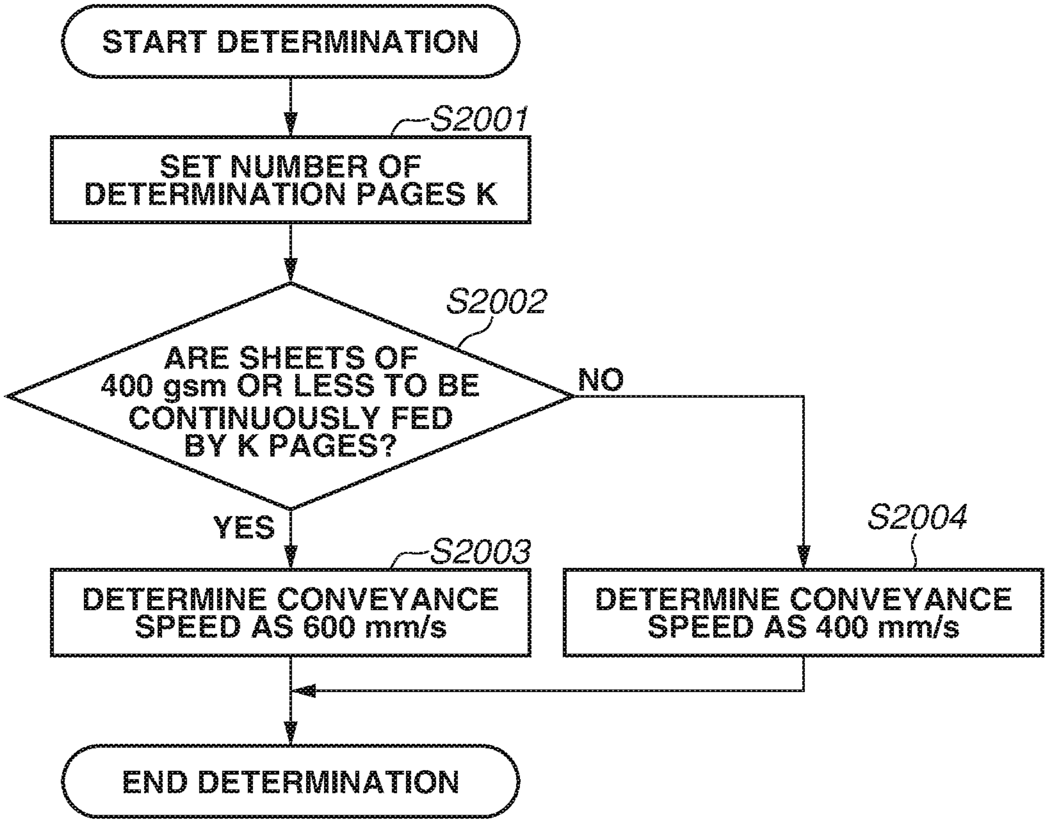
FIG. 9 is a flowchart illustrating processing for determining a conveyance speed of a first page.

A determination method of the conveyance speed of the first page according to the present exemplary embodiment will be described with reference to FIG. 9.

In step S2001, the CPU 222 calculates the number of pages K that is used to determine the conveyance speed. The number of pages K is M pages or L pages when the entire pages of the job is less than M pages. More specifically, "K" is 1 in the first mode. In the second mode, "K" is either 100 or "L" which is the number of entire pages of the job.

In step S2002, based on printing information for K pages acquired by the scheduled printing information acquisition processing described above, the CPU 222 determines whether recording materials of 400 gsm or less, which is printable at high speed, are to be continuously fed by a predetermined number. In a case where the CPU 222 determines that recording materials is printable at high speed (YES in step S2002), the processing proceed to step S2003.

In step S2003, the CPU 222 determines that K pages can be printed at 600 mm/s, and the control unit 262 sets the conveyance speed to 600 mm/s.

In a case where a recording material of the second grammage (greater than 400 gsm) is included in the K pages and the CPU 222 determines that recording materials is not printable at high speed in step S2002 (NO in step S2002), the processing proceeds to step S2004. In a case where recording materials of the first and the second grammages are mixed in the K pages, a recording material of the first grammage is to be printed at the second speed, whereas a recording material of the second grammage is to be printed at the first speed. If the conveyance speed is changed every time the grammage is changed, a frequency of changing the conveyance speed is increased, which causes decrease in the number of printed sheets per unit time. The conveyance speed is thus set to low speed (i.e., 400 mm/s, in the present exemplary embodiment) to reduce a frequency of changing the conveyance speed. In this way, productivity can be improved. The printing is thus started at low conveyance speed of 400 mm/s.

As described above, the control unit 262 sets the conveyance speed based on the information about recording materials acquired by the acquisition unit 261, and thus determines the speed of the first page.

In the above-described exemplary embodiment, the printing time is shortened by changing the conveyance speed within K pages when the first mode is executed. However, the number of pages is not limited to K pages because the number of required pages may vary depending on the configuration of the image forming apparatus 101. Further, the speeds are not limited to the above-described two speeds, i.e., 600 mm/s and 400 mm/s, and the speeds can be different speeds. Furthermore, three or more different speeds can be specified.

<In-Printing Conveyance Speed Determination Processing>

Figure 10:
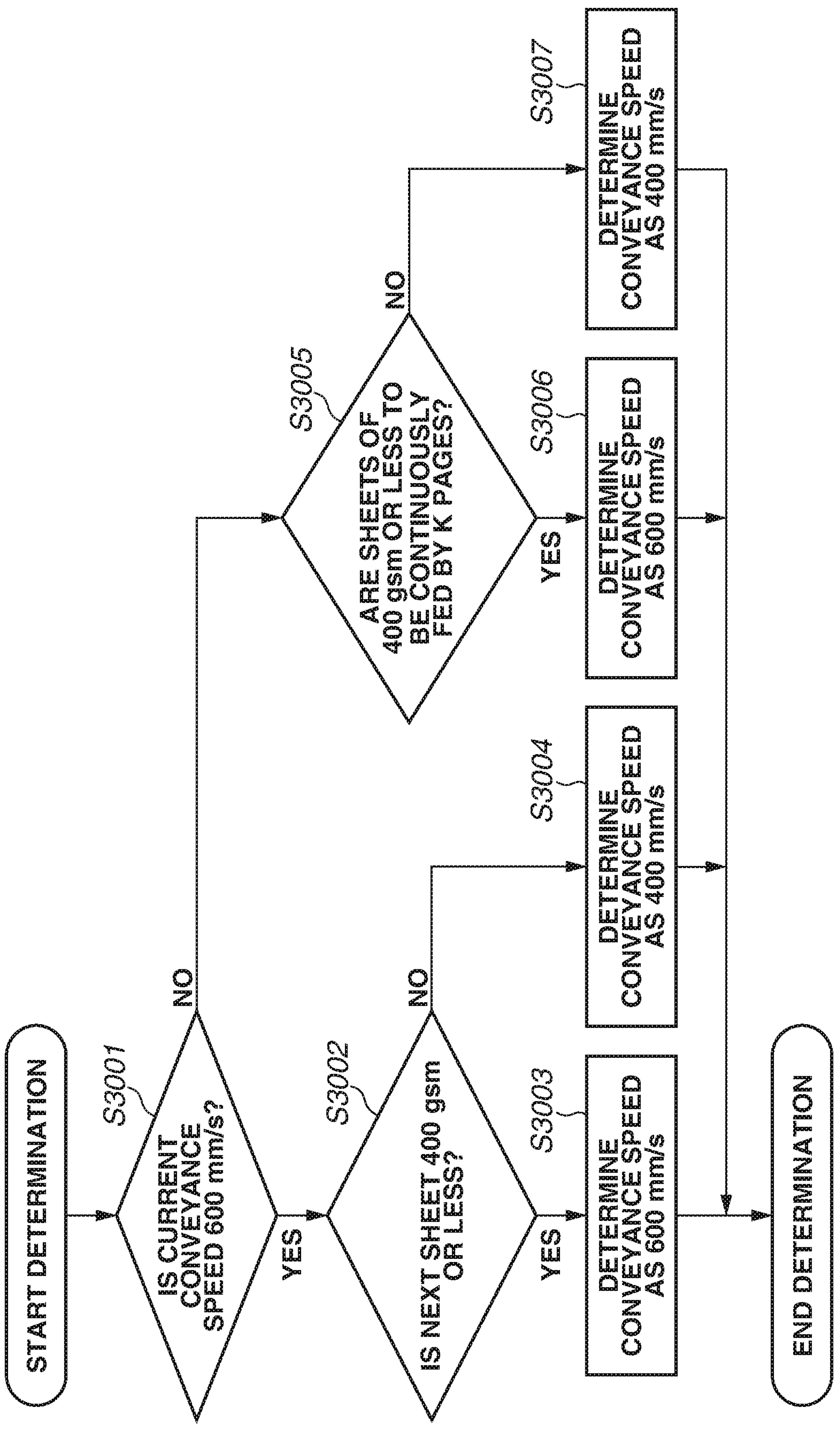
FIG. 10 is a flowchart illustrating processing for determining a conveyance speed during execution of a job.

FIG. 10 is a flowchart illustrating the conveyance speed determination processing of the N+1th page (in step S106) executed in the middle of the printing operation.

In step S3001, the CPU 222 determines whether conveyance is currently being executed at high speed of 600 mm/s.

In a case where conveyance is being executed at high speed of 600 mm/s (YES in step S3001), the processing proceeds to step S3002. In step S3002, the CPU 222 checks whether a grammage of the next recording material is 400 gsm or less.

In a case where a grammage of the subsequent recording material is 400 gsm or less (YES in step S3002), the processing proceeds to step S3003. In step S3003, the CPU 222 determines that the conveyance speed of the next recording material is also high speed of 600 mm/s. Specifically, high speed is set when a grammage of the next recording material is 400 gsm.

In a case where a grammage of the next recording material is greater than 400 gsm (NO in step S3002), the processing proceeds to step S3004. In step S3004, the CPU 222 determines that the conveyance speed of the next recording material is low speed of 400 mm/s. Specifically, low speed is set when a grammage of the next recording material is 450 gsm.

In a case where conveyance is not being executed at high speed of 600 mm/s, i.e., conveyance is being executed at low speed of 400 mm/s (NO in step S3001), the processing proceeds to step S3005. In step S3005, the CPU 222 checks whether recording materials of 400 gsm or less are to be continuously fed by K pages.

In a case where recording materials of 400 gsm or less are continuously fed by K pages (YES in step S3005), the processing proceeds to step S3006. In step S3006, the CPU 222 determines that the conveyance speed of the next recording material is high speed of 600 mm/s. Specifically, high speed is set in a case where recording materials of 300 gsm are to be continuously fed by 100 pages.

In a case where recording materials of 400 gsm or less are not to be continuously fed by K pages (NO in step S3005), the processing proceeds to step S3007. In step S3007, the CPU 222 determines that the conveyance speed of the next recording material is low speed of 400 mm/s. Specifically, low speed is set when a recording material of 450 gsm is mixed in the K pages, or when the remaining number of printing pages is less than the K pages.

By the above-described processing, the CPU 222 can determine a conveyance speed of a recording material to be fed next while printing is being executed.

An advantage of the second mode according to the present exemplary embodiment will be described. The acquisition unit 261 previously acquires the information about a predetermined number of recording materials before printing is executed. The control unit 262 controls the conveyance speed based on the information. In a case where the information contains information about recording materials of the first grammage and the second grammages, the control unit 262 sets the conveyance speed to the first speed. With this processing, recording materials of the first and the second grammages are conveyed at the first speed. In this way, a frequency of changing the conveyance speed can be reduced in comparison to a case of the first mode in which the recording material of the first grammage is conveyed at the second speed and the recording material of the second grammage is conveyed at the first speed. Thus, downtime caused by changing the conveyance speed can be shortened. As a result, productivity of the mixed job can be improved.

In the present exemplary embodiment, time for changing the conveyance speed is approximately 30 seconds. For example, in a case where the information about the predetermined number of recording materials subsequent to the first recording material, which is acquired by the acquisition unit 261, is information about recording materials of the first grammage when the first recording material is a recording material of the second grammage, fixation is also executed at the first speed. In a case described in the present exemplary embodiment, since time for changing the conveyance speed is long, productivity can be improved by executing fixation at the first speed in comparison to a case where time is consumed on changing the conveyance speed.

In a case where the second mode is executed, a recording material of the first grammage can be conveyed at the first speed or the second speed in accordance with the job. A fixing temperature to be specified in this case will be described. As illustrated in FIGS. 6A to 6C, a fixing temperature to be set when a recording material of the first grammage is conveyed at the first speed is lower than a fixing temperature to be set when the recording material of the first grammage is conveyed at the second speed. This is because the fixing temperature is set by factoring a length of time in which the recording material is held by the nip portion N. Because an amount of heat applied to the recording material increases with increase in the length of time in which the recording material is held by the nip portion N, the fixing temperature can be set low with increase in the length of time.

In a case where a recording material is conveyed at the second speed in a mixed job executed in the second mode, the conveyed recording material is a recording material of the first grammage. In this case, in a case where information about a recording material of the second grammage is contained in the information about recording materials acquired by the acquisition unit 261, the conveyance speed is changed to the first speed. The conveyance speed is changed at a timing when a type of conveying recording material is changed from a recording material of the first grammage to a recording material of the second grammage. The number of recording materials conveyed at the second speed in this case is greater than that of the case where the conveyance speed is changed at a timing of the determination that the information about a recording material of the second grammage is contained in the information about recording materials acquired by the acquisition unit 261, and the productivity is increased because the number of recording materials conveyed at the second speed is greater. Thus, in the second mode according to the present exemplary embodiment, the conveyance speed is changed to the second speed from the first speed at a timing when a type of conveying recording material is changed to a recording material of the second grammage in a state where the recording material is being conveyed at the first speed.

The present exemplary embodiment has been described using a case in which recording materials are high-quality paper of a same type. However, in a case where the recording materials are coated paper, for example, a heat amount for fixation is large in comparison to the high-quality paper. Thus, although a threshold of the first and the second grammages set for the high quality paper is 400 gsm, a threshold set for the coated paper is smaller than 400 gsm, e.g., 300 gsm.

A second exemplary embodiment will be described. In the present exemplary embodiment, determination is executed by factoring changing of a fixing temperature in addition to changing of a conveyance speed described in the first exemplary embodiment. The redundant descriptions of configurations similar to the configurations described in the first exemplary embodiment are omitted.

The image forming apparatus 101 according to the present exemplary embodiment executes image forming processing based on a relationship between a grammage, a conveyance speed, and a fixing temperature illustrated in FIG. 13.

<Determination Processing of Conveyance Speed of First Page>

Figure 14:
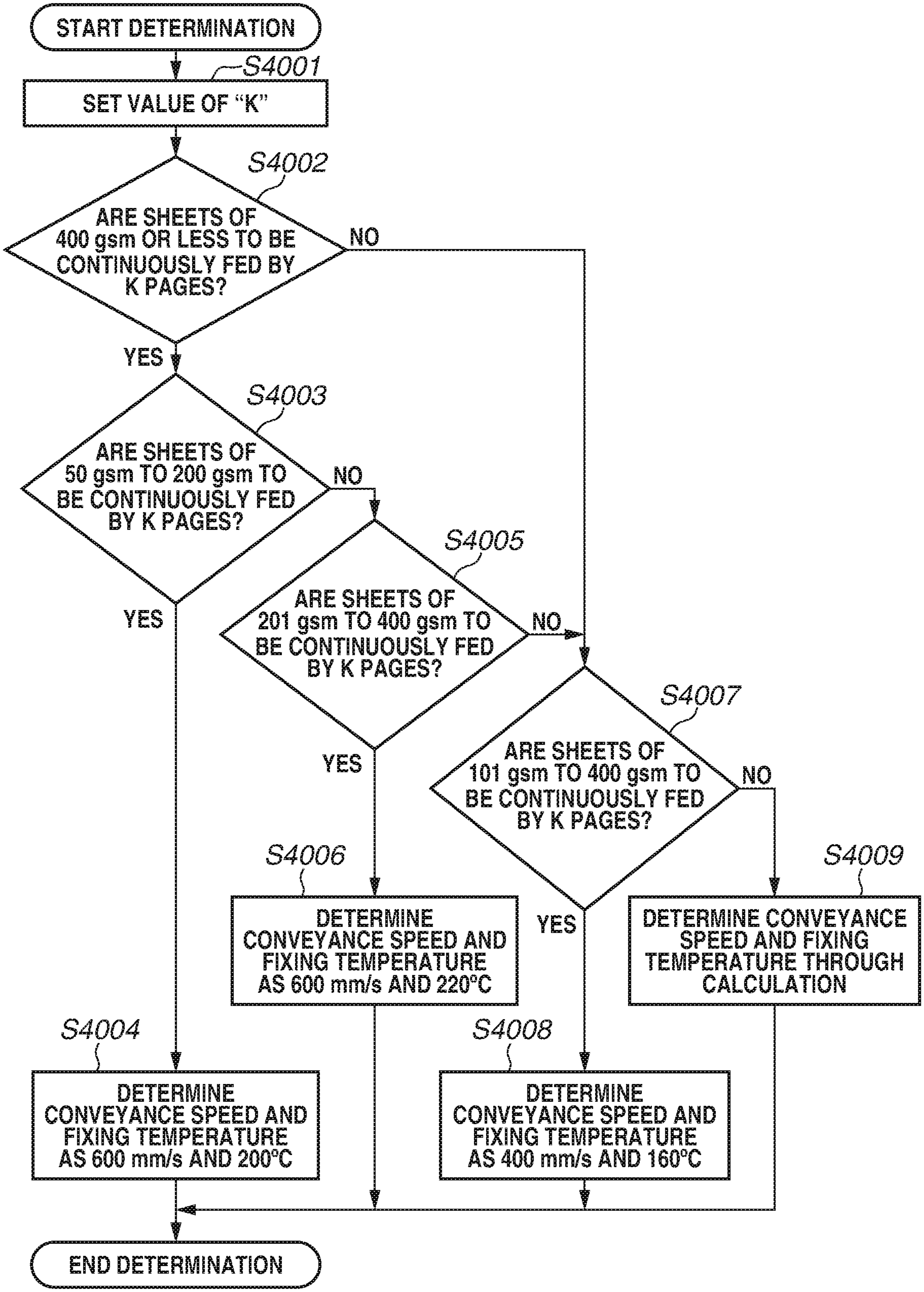
FIG. 14 is a flowchart illustrating processing for determining a conveyance speed of a first page according to the second exemplary embodiment.

A determination method of the conveyance speed of the first page according to the present exemplary embodiment will be described with reference to a flowchart in FIG. 14.

In step S4001, the CPU 222 calculates the number of pages K that is used to determine the conveyance speed. The number of pages K is M pages or L pages when the entire pages of the job is less than M pages. More specifically, “K” is 1 in the first mode. In the second mode, “K” is either 100 or “L” which is the number of entire pages of the job.

In step S4002, by using the printing information corresponding to K pages acquired by the scheduled printing information acquisition processing described above, the CPU 222 determines whether recording materials of 400 gsm or less, which is printable at high speed, are to be continuously fed by K pages.

In a case where the CPU 222 determines that recording materials of 400 gsm or less, which is printable at high speed, are continuously fed by K pages (YES in step S4002), the processing proceeds to step S4003. In step S4003, in order to check whether printing can be executed with a fixing temperature of 200 Celsius (° C.), the CPU 222 determines whether recording materials of grammages of 50 gsm to 200 gsm are to be continuously fed by K pages.

In a case where recording materials of grammages of 50 gsm to 200 gsm are to be continuously fed by K pages (YES in step S4003), the processing proceeds to step S4004. In step S4004, the CPU 222 determines the conveyance speed and the fixing temperature as 600 mm/s and 200° C. respectively, and ends the processing.

In a case where the CPU 222 determines that recording materials of grammages of 50 gsm to 200 gsm are not to be continuously fed by K pages (NO in step S4003), the processing proceeds to step S4005. In step S4005, in order to check whether printing can be executed with a fixing temperature of 220° C., the CPU 222 determines whether recording materials of grammages of 201 gsm to 400 gsm are to be continuously fed by K pages.

In a case where recording materials of grammages of 201 gsm to 400 gsm are to be continuously fed by K pages, (YES in step S4005), the processing proceeds to step S4006. In step S4006, the CPU 222 respectively the conveyance speed and the fixing temperature as 600 mm/s and 220° C. respectively, and ends the processing.

In step S4002, in a case where the CPU 222 determines that recording materials of 400 gsm or less are not to be continuously fed by K pages (NO in step S4002), the processing proceeds to step S4007. Further, in a case where recording materials of grammages of 201 gsm to 400 gsm are not to be continuously fed by K pages in step S4005, (NO in step S4005), the processing also proceeds to step S4007. In step S4007, in order to check whether printing can be executed with a fixing temperature of 160° C., the CPU 222 determines whether recording materials of grammages of 101 gsm to 400 gsm are to be continuously fed by K pages.

In a case where recording materials of grammages of 101 gsm to 400 gsm are to be continuously fed by K pages, (YES in step S4007), the processing proceeds to step S4008. In step S4008, the CPU 222 determines the conveyance speed and the fixing temperature as 400 mm/s and 160° C. respectively, and ends the processing.

In a case where the CPU 222 determines that recording materials of grammages of 101 gsm to 400 gsm are not to be continuously fed by K pages in step S4007 (NO in step S4007), the fixing temperature or the conveyance speed is to be changed at least once. Thus, in step S4009, the CPU 222 determines the conveyance speed and the fixing temperature which minimize a total of time for conveying the recording material, time for changing the fixing temperature, and time for changing the conveyance speed.

By the above-described processing, the CPU 222 can determine the conveyance speed and the fixing temperature of the first page. The in-printing conveyance speed and the fixing temperature, which are determined with respect to the first page, are continuously set as much as possible, and the in-printing conveyance speed and the fixing temperature are changed at a timing when a recording material which cannot be printed without making changes is printed.

As described above, according to the present exemplary embodiment, with respect to a print job which involves changes of the conveyance speed and the fixing temperature, the CPU 222 can reduce time for the changing by selecting the conveyance speed and the fixing temperature based on the information about a plurality of recording materials acquired before the printing. Thus, time for completing the print job can be shortened.

In a case where the image forming apparatus 101 suspends the image forming processing for some reason (e.g., occurrence of jam) and resumes the image forming processing, the acquisition unit 261 executes the determination processing of the conveyance speed of the first page. With this configuration, the image forming apparatus 101 can resume the image forming processing without using the information about recording materials acquired before the suspension. For example, even if the conveyance speed before the suspension is low speed, the image forming apparatus 101 can set the conveyance speed to the second speed in a case where the recording materials to be conveyed after the suspension are recording materials of the first grammage. With the above-described configuration, the productivity after occurrence of the suspension can be improved.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-061619, filed Apr. 1, 2022, which is hereby incorporated by reference herein in its entirety.

What is claimed is:

1. An image forming apparatus comprising:

a heating rotary member configured to apply heat to a recording material;

a pressurizing rotary member configured to form a nip portion by pressurizing the heating rotary member, wherein the heating rotary member and the pressurizing rotary member apply heat and pressure to the recording material to perform fixing of a toner image on the recording material;

an acquisition unit configured to acquire information about a grammage of the recording material on which the toner image fixing is to be executed; and a speed control unit configured to control a conveyance speed of the recording material at the nip portion, wherein a job in which a first recording material of a first grammage and a second recording material of a second grammage greater than the first grammage are mixed is specified as a mixed job, wherein the speed control unit is capable of setting the conveyance speed of the recording material to a first speed or a second speed faster than the first speed, wherein the mixed job can be executed in any one of a plurality of modes including a first mode and a second mode, wherein, in a case where the mixed job is a first mixed job to be executed in the first mode and the first recording material is to be initially conveyed and the second recording material is to be conveyed subsequent to the first recording material, the speed control unit sets a conveyance speed of the first recording material to the second speed based on the acquired grammage information and sets a conveyance speed of the second recording material to the first speed based on the acquired grammage information, and wherein, in a case where the mixed job is a second mix job to be executed in the second mode and the first recording material is to be initially conveyed and the second recording material is to be conveyed subsequent to the first recording material, the speed control unit sets the conveyance speed of the first recording material and of the second recording material to the first speed based on the acquired grammage information.

2. The image forming apparatus according to claim 1, wherein, in the first mixed job, the speed control unit sets the conveyance speed of the first recording material to the second speed based on acquired grammage information about the first recording material and sets the conveyance speed of the second recording material to the first speed based on acquired grammage information about the second recording material, and wherein, in the second mixed job, the speed control unit sets a conveyance speed of the first recording material and of the second recording material to the first speed based on the acquired grammage information about the first recording material and the acquired grammage information about the second recording material.

3. The image forming apparatus according to claim 1, wherein, in acquiring the information in a case where the second mode is to be executed, the acquisition unit further acquires information about a predetermined number of recording materials before an initial recording material of a print job is conveyed to the nip portion.

4. The image forming apparatus according to claim 3, wherein a number of recording materials contained in the information acquired by the acquisition unit before the initial recording material of the print job is conveyed to the nip portion is greater in the second mode than in the first mode.

5. The image forming apparatus according to claim 4, wherein, in a case where the first mode is executed, the number of recording materials contained in the information is one.

6. The image forming apparatus according to claim 5, wherein, in the case where the second mode is executed, the number of recording materials contained in the information is more than one.

7. The image forming apparatus according to claim 6, wherein, in the case where the second mode is executed, the number of recording materials contained in the information is ten or more.

8. The image forming apparatus according to claim 3, wherein, in a case where a print job of a number of recording materials greater than the predetermined number of recording materials is executed in the second mode, the acquisition unit updates the information during execution of the print job.

9. The image forming apparatus according to claim 3, wherein the predetermined number of recording materials is optionally changeable.

10. The image forming apparatus according to claim 3, wherein, in a case where the print job is suspended and returned from the suspension during execution of the print job in the second mode, the acquisition unit acquires the information about the predetermined number of recording materials and the speed control unit sets the conveyance speed of the recording material based on the acquired grammage information acquired by the acquisition unit.

11. The image forming apparatus according to claim 1, wherein, in a case where the mixed job is a third mixed job to be executed in the second mode and both the first recording material to be initially conveyed and the second recording material to be conveyed subsequent to the first recording material are recording materials of the first grammage, the speed control unit sets the conveyance speeds of the first and the second recording materials to the second speed based on the acquired grammage information.

12. The image forming apparatus according to claim 11, wherein, a temperature of the heating rotary member for fixing on the recording material of the first grammage at the first speed in the second mode is lower than a temperature of the heating rotary member for fixing on the recording material of the first grammage at the second speed in the second mode.

13. The image forming apparatus according to claim 1, wherein, in a case where the second mode is executed and the acquisition unit further acquires information about a predetermined number of recording materials and this further acquired information indicates that all of the predetermined number of the recording materials are recording materials of the first grammage or less, fixing of the toner image on the predetermined number of recording materials is executed at the second speed.

14. The image forming apparatus according to claim 1, further comprising an operation unit configured to be used by a user to operate the acquisition unit to acquire the grammage information.

15. The image forming apparatus according to claim 14, further comprising an external interface configured to input information about the grammage of the recording material on which the toner image fixing is to be executed.

* * * * *